United States Patent [19]

Saathoff et al.

[11] Patent Number: 5,125,499
[45] Date of Patent: Jun. 30, 1992

[54] ARTICLE TRANSFER MECHANISM

[75] Inventors: David A. Saathoff, McHenry; James L. Dempski, Green Oaks; Joel Mosak, Deerfield, all of Ill.

[73] Assignee: VHC, Ltd., West Palm Beach, Fla.

[21] Appl. No.: 643,149

[22] Filed: Jan. 18, 1991

Related U.S. Application Data

[63] Continuation of Ser. No. 428,052, Oct. 27, 1989.

[51] Int. Cl.⁵ ............................................. B65G 25/00
[52] U.S. Cl. .............................. 198/468.01; 198/740; 65/163; 364/473; 364/478
[58] Field of Search .................. 198/357, 468.01, 739, 198/740, 745; 65/160, 163, 260; 364/473, 476, 478

[56] References Cited

U.S. PATENT DOCUMENTS

| | | | |
|---|---|---|---|
| 3,324,986 | 6/1967 | Dierksheide et al. | 198/468.01 |
| 3,400,802 | 9/1968 | Rowe | 198/468.01 |
| 3,716,126 | 2/1973 | Perry et al. | 198/468.01 |
| 4,007,028 | 2/1977 | Bublitz et al. | 65/163 |
| 4,313,750 | 2/1982 | Lulejian et al. | 65/160 |
| 4,427,431 | 1/1984 | Mumford et al. | 364/473 |
| 4,429,781 | 2/1984 | Holzhauser | 198/357 |
| 4,548,637 | 10/1985 | Miller | 65/160 |
| 4,623,375 | 11/1986 | Cardenas-Franco et al. | 65/160 |
| 4,685,947 | 8/1987 | Liska et al. | 65/160 |
| 4,708,727 | 11/1987 | Cardenas-Franco et al. | 65/163 |
| 4,783,746 | 11/1988 | Cardenas-Franco | 65/160 |
| 4,799,947 | 1/1989 | Miyagi et al. | 65/160 |
| 4,923,499 | 5/1990 | Newkirk | 65/163 |

Primary Examiner—Joseph E. Valenza
Attorney, Agent, or Firm—Woodard, Emhardt, Naughton, Moriarty & McNett

[57] ABSTRACT

An article transfer mechanism for use with an I.S. glassware forming machine includes a pusher arm having fingers for engaging a number of glassware articles formed by the I.S. machine, the pusher arm being movable between a first position to engage the glassware at the dead plate and a second position at which the glassware is transferred to a take-away conveyor. A stepping motor is provided for moving the pusher arm between the first and second positions according to a velocity profile. A microcontroller and electronic circuitry associated with each section of the I.S. machine determine a new current position of the pusher arm as the arm moves according to the velocity profile. The microcontroller performs calculations at each new current position of the pusher arm according to an equation contained in a memory to determine a new velocity for the pusher ar at the new current position of the arm as a function of the current position, such that each new velocity at each current position defines the velocity profile. The microcontroller performs the calculations "on-the-fly" as the pusher arm is moving through its 90° sweep between the dead plate to the conveyor. The stored equation operates on user-input variables which permit the I.S. machine operator to alter the velocity profile and performance characteristics of the article transfer mechanism from an associated data entry terminal while the I.S. machine is operating.

14 Claims, 7 Drawing Sheets

```
SYSTEM PROGRAM          ╱─81
JOB NO.    12345678
                    ╱─82
SYSTEM CONFIGURATION:
  MASTER OFFSET:         123 DEGREES    STACKER OFFSET:            999 DEGREES
  NO. SECTIONS:           10            STACKER OUTPUT TIME:       0.50 SEC
  GOBS PER SECTION:    ╱83 3            WARE SPACING:             10.500"
PROFILE DATA:         ╱
  START VELOCITY:        1.00           RETURN SLEW VELOCITY:     10.00  ⎫
  MINIMUM VELOCITY:      1.00           CREEP HOME VELOCITY:       1.00  ⎬ 83a

PUSHOUT STEPS:          103           RETURN STEPS:              104  ⎫
  INITIAL ACCEL STEPS:     40           ACCEL/DECEL RAMP STEPS:     25  ⎬ 83b
  PUSHOUT SLEW STEPS:      50           CREEP HOME STEPS:            1  ⎭
  INITIAL ACCEL:        X = 1.9         OTHER RAMPS:            X = 1.9 ⎫ 83c
                        Y = 1.9                                 Y = 1.9 ⎭

ERROR MESSAGE: SECTION IS OPERATION CORRECTLY

ENTER __
  1-12 FOR SECTION PROGRAM, 20 FOR SYSTEM PROGRAM, 30 FOR STATUS SCREEN,
  40 FOR MACHINE SETUP, 50 FOR SWAB SECTION
```

Fig. 9A

```
MACHINE SETUP

PUSHOUT ARM RADIUS:   10.75"      STEPS TO POWER-UP:      100      ⎫
  GEAR RATIO:           3:1         SPEED CALIBRATION:      9.99999  ⎬ 91

AUX. START INPUT:     DISABLED    (PRESS 'CLEAR' TO TOGGLE.)
  SWAB CARD INSTALLED:  NO

OPTIONAL SERIAL PORT
  BAUD RATE:            9600        (PRESS 'CLEAR' TO TOGGLE.)
  PORT PROTOCOL:        ODD PARITY, 7 DATA BITS

COUNTER RESET:
  TOTAL BOTTLES:        12345678    RESET? N    (PRESS 'CLEAR' TO TOGGLE.) ⎫
  GOOD BOTTLES:         12345678    RESET? N                               ⎪
  LAST SHIFT, GOOD:     12345678    RESET? N                               ⎬ 92
  REJECT BOTTLES:       12345678    RESET? N                               ⎪
  LAST SHIFT, REJECT:   12345678    RESET? N                               ⎭

ENTER __
  1-12 FOR SECTION PROGRAM, 20 FOR SYSTEM PROGRAM, 30 FOR STATUS SCREEN,
  40 FOR MACHINE SETUP, 50 FOR SWAB SECTION
```

Fig. 9B

```
SECTION 01 PROGRAM             ─96                                   ─97
SECTION OFFSET:      123          AIR OFFSET:         123
RETRACT OFFSET:      123─
                         ─98                                    ─98
INPUT STATUS:
 SECTION SWITCH:     ON, SECTION IS DISABLED      CYCLE: (*)
 AUXILLARY START:    DISABLED

SWAB FRONT:         ON           CAVITY SWITCHES:
 SWAB BACK:          OFF                          SW1=ON
 ALARM INPUT:        OFF                          SW2=OFF
                                                  SW3=OFF

OUTPUT STATUS:
 RETRACT OUTPUT:     OFF          AIR OUTPUT:        OFF

ERROR MESSAGE:  CHECK SECTION DISABLE SWITCH

ENTER __
 1-12 FOR SECTION PROGRAM, 20 FOR SYSTEM PROGRAM, 30 FOR STATUS SCREEN,
 40 FOR MACHINE SETUP, 50 FOR SWAB SECTION
```

Fig. 9C

```
TOTAL BOTTLES: 12345678
 GOOD BOTTLES:             12345678      REJECT BOTTLES:      12345678
 LAST SHIFT, GOOD:         12345678      LAST SHIFT, REJECT:  12345678
 PRODUCTION RATE:          123    BPM    REJECT RATE:         123    BPM

SECTION STATUS:                                              (CYCLE)
 MASTER:       SECTION IS OPERATING CORRECTLY
 SECTION 1:    SECTION IS OPERATING CORRECTLY                 (*)
 SECTION 2:    SECTION IS OPERATING CORRECTLY                 ( )
 SECTION 3:    SECTION IS OPERATING CORRECTLY                 (*)
 SECTION 4:    CHECK SECTION DISABLE SWITCH                   ( )
 SECTION 5:    INDEX PULSE HAS NOT BEEN DETECTED              ( )
 SECTION 6:    SECTION IS OPERATING CORRECTLY                 (*)
 SECTION 7:    SECTION IS OPERATING CORRECTLY                 (*)
 SECTION 8:    NO RESPONSE FROM SECTION                       ( )
 SECTION 9:    CHECK SECTION SCREEN FOR ERROR                 ( )
 SECTION 10:   SECTION IS OPERATING CORRECTLY                 (*)
 SECTION 11:   SECTION IS OPERATING CORRECTLY                 ( )
 SECTION 12:   SECTION IS OPERATING CORRECTLY                 (*)
 SWAB          CHECK SECTION SCREEN FOR ERROR

ENTER __
 1-12 FOR SECTION PROGRAM, 20 FOR SYSTEM PROGRAM, 30 FOR STATUS SCREEN,
 40 FOR MACHINE SETUP, 50 FOR SWAB SECTION
```

Fig. 9D

ARTICLE TRANSFER MECHANISM

This application is a continuation of application Ser. No. 428,052, filed Oct. 27, 1989, now abandoned.

BACKGROUND OF THE INVENTION

The present invention is directed to an article transfer mechanism, such as a 90° pusher, which is adapted for use in a wide variety of individual section machines (so-called I.S. machines). In particular, the invention is directed to a 90° pusher that moves at an angular speed profile is governed by a user-modifiable algorithm to tailor the angular speed profile according to I.S. production parameters.

So-called 90° pushers are known in the art, examples of which are found in U.S. Pat. Nos. 3,779,362 and 4,203,752. (The 90° pushers are also known in the art as pushout, sweepout or take-away devices.) The 90° pusher transfers articles, such as newly formed glass containers, from the dead plate of an I.S. machine to a moving conveyor. Typically, plural pusher stations are employed, each of the stations being operated in a predetermined timed sequence. The sequence of operation of the pusher stations may be governed by a drum and cam mechanism, or by a timing disk and electric switch network. In addition, the motion profile of the 90° pusher as it moves through its arc can be governed by a mechanical cam. The cam determines the speed of rotation of the pusher at various positions along the arc, known in the art as the speed or velocity profile of the pusher. Different articles and conveyor speeds frequently require different pusher speed profiles to insure a smooth transfer of the article to the conveyor.

In U.S. Pat. No. 4,203,752 to Becker, the speed profile of the pusher arm of the 90° pusher is determined by an electric motor driving a crank and rocker mechanism. Mechanisms of this type have interrelated mechanical parts which are subject to malfunction and wear. However, mechanisms of this type have some provision for adjustment of the speed profile of the pusher arm by variations in the voltage provided to the electric motor driving the arm.

In an improvement on the system described in the Becker patent, plural pusher stations are electronically controlled in a predetermined timed sequence. The angular speed profile of the pusher arm is determined by a PROM or other programmable electronic element in the pusher station electronic circuit. A system of this type is described in the co-pending application of Newkirk, Ser. No. 348,154, which issued as U.S. Pat. No. 4,923,499 and which is a continuation of abandoned application Ser. No. 206,907 which is also a continuation of the abandoned parent application Ser. No. 216,334 all assigned to the assignee of the present invention. In this system, a stepping motor is utilized to rotate the pusher arm. The stepping motor advances in rotary or angular increments which causes stepwise rotation of the pusher arm. The angular speed profile of the pusher arm then is determined by the dwell time between steps of the stepping motor.

In U.S. Pat. No. 4,923,499, data stored in the PROM corresponds to the number of steps to be counted up to by a speed counter before an index signal is sent to the stepping motor control circuit. The stepping motor control circuit indexes or steps the stepping motor in response to the index signal. The rate at which the index signals are sent to the stepping motor control circuit determines the speed profile of the motor and the pusher. The data in the PROM also controls the number of motor steps based upon a one-to-one correspondence to the number of data words in the PROM. This system is described more fully in U.S. Pat. No. 4,923,499, particularly at Col. 7, line 57 to Col. 12, line 49 and accompanying FIGS. 14-16, which disclosure is incorporated herein by reference. Other examples of electronic controls for 90° pushers are shown in U.S. Pat. Nos. 4,313,750 and 4,409,013.

SUMMARY OF THE INVENTION

It is an object of the present invention to provide an article transfer mechanism that is capable of transferring objects from a first location to a second location according to a velocity profile. Another object is to provide such a mechanism that is capable of calculating the velocity profile "on the fly"—that is, the next movement of the mechanism is determined based upon the last movement of the mechanism.

Another object is to provide an article transfer mechanism that permits ready and easy modification and tailoring of the velocity profile of the mechanism by a human operator while the mechanism is in operation.

These and other objects and benefits are provided by an article transfer mechanism, in one embodiment of the present invention, for transferring a number of glassware articles from a dead plate of a glassware forming machine to a take-away conveyor, comprising a pusher arm having means for engaging the number of glassware articles, the pusher arm being rotatable between a first position to engage the glassware at the dead plate and a second position at which the glassware is transferred to the take-away conveyor. Means are provided for rotating the pusher arm between the first and the second positions according to a velocity profile, which includes, for instance, a microcontroller having a stored program for performing calculations at each new current position of the pusher arm according to an equation contained in a memory to determine a new velocity for the pusher arm at the new current position of the arm. Each new velocity at each current position defines the velocity profile of the pusher arm. The microcontroller maintains an indicator value indicative of the current position of the pusher arm as the arm moves according to the velocity profile between a first and a second position. The equation in memory determines the new velocity as a function of this position indicator value. The microcontroller transmits an index signal to means for rotating the pusher arm at the new velocity from the current position, which means in the preferred embodiment includes a stepping motor and stepping motor control circuit.

In another embodiment, an article transfer apparatus comprises a pusher arm rotatable between a first position and a second position. A motor is coupled to the pusher arm for controlling the rotational motion of the arm between the first position and the second position. Means are provided for generating a periodic timing signal, such as an oscillator. A motor control circuit, which can include a microcontroller, controls the speed of the motor based upon a calculation, according to an equation contained in a memory, of a current speed of the motor, the calculation occurring at each of several discrete times determined by the timing signal while the pusher arm rotates between the first and second positions.

In still another embodiment, an article transfer apparatus comprises a pusher arm rotatable between a first position and a second position which is driven by a variable torque motor coupled to the pusher arm for controlling the rotational motion of the arm between the first position and the second position. Means are provided for controlling the speed of the motor so that the pusher arm rotates between the first and second positions according to a velocity profile, which means can include a microcontroller. Means are also provided for selectably varying the torque of the motor when the pusher arm is at a number of pre-selected positions between the first position and the second position, which means may include the microcontroller.

In another aspect of the invention, means are provided for controlling the speed of rotation of the motor coupled to the pusher arm so that the velocity profile of the pusher arm has a pre-determined minimum velocity and a maximum velocity which is related to the speed of a moving take-away conveyor. This speed controlling means includes means for changing the maximum speed in relation to changes in the speed of the take-away conveyor while the minimum velocity remains fixed.

In yet another aspect of the invention, a data entry terminal is provided having an output coupled to the microcontroller which controls the rotation of the pusher arm motor. The data entry terminal permits manual entry of variable data words for storage in the variable memory and for use in the performing the current pusher arm velocity calculations while the article transfer apparatus is operating.

Other objects, features and advantages of the present invention will become apparent from the following written description and accompanying figures.

BRIEF DESCRIPTION OF THE DRAWINGS

FIG. 9A is a pictorial representation of a system program data screen displayed by the data entry terminal for use with the article transfer mechanism of the present invention.

FIG. 9B is a pictorial representation of a machine setup data screen displayed by the data entry terminal for use with the article transfer mechanism of the present invention.

FIG. 9C is a pictorial representation of a section program data screen displayed by the data entry terminal for use with the article transfer mechanism of the present invention.

FIG. 9D is a pictorial representation of a section status data screen displayed by the data entry terminal for use with the article transfer mechanism of the present invention.

DESCRIPTION OF THE PREFERRED EMBODIMENTS

Figure 1:
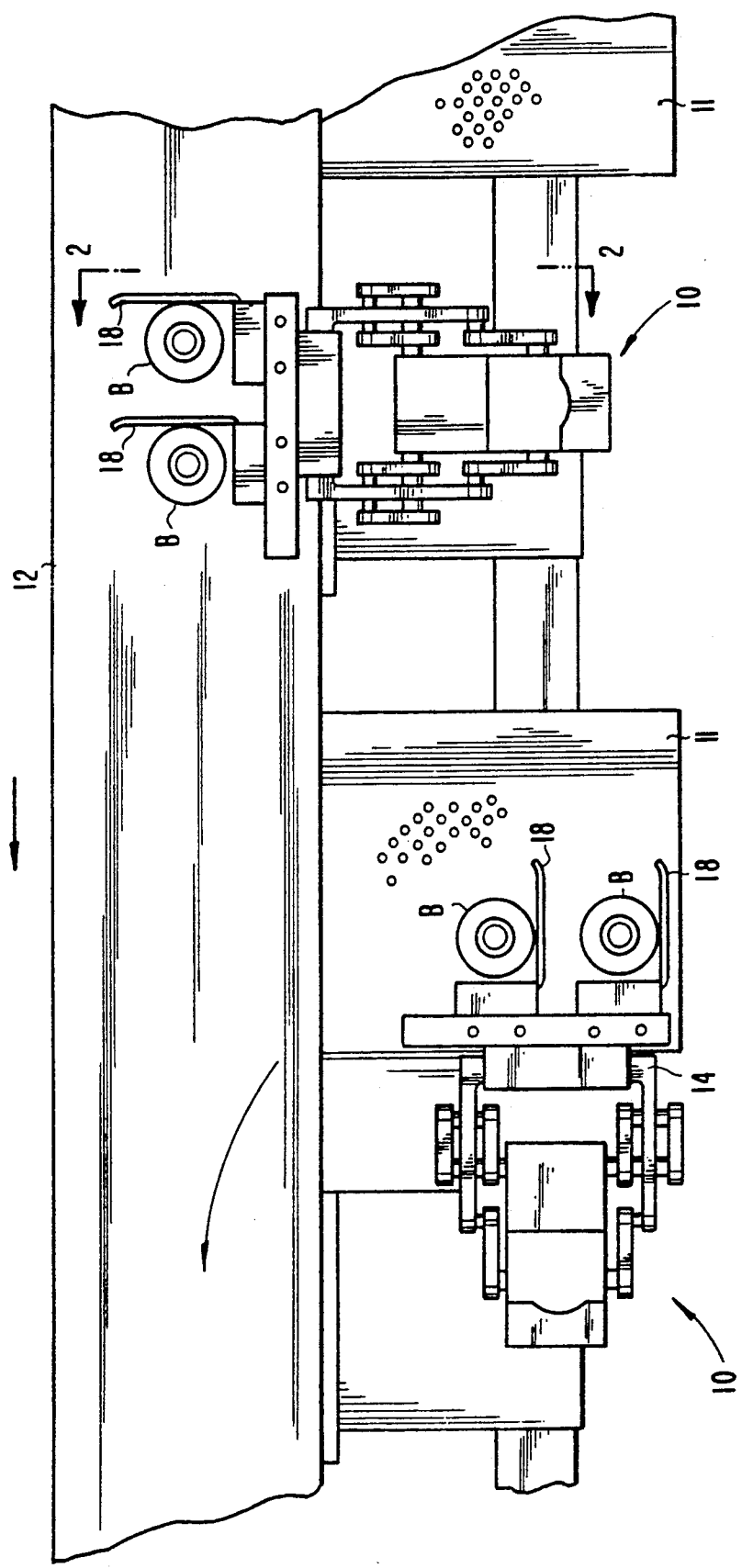
FIG. 1 is a top elevational view of the article transfer mechanism of the present invention shown in operative association with the take-away conveyor of a glassware forming machine.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the drawings in detail, there is shown in FIG. 1 a top elevational view of two operating article transfer mechanisms, or 90° pushers, each designated generally as pusher mechanisms 10. Each mechanism 10 is shown as a right-hand mechanism which transfers articles, such as newly formed glass bottles B, which have been deposited on a dead plate 11 by an I.S. machine. The 90° mechanism 10 transfers the bottles B from the dead plate 11 to a moving conveyor 12 which moves from right to left in FIG. 1. It is understood that the pusher mechanisms 10 could also be left-handed mechanisms located on the opposite side of the dead plate to transfer articles from the dead plate to a conveyor which moves from left to right in FIG. 1. The invention herein covers both right-hand and left-hand mechanisms. It is also understood that more than two transfer mechanisms can transfer articles onto a single conveyor. A typical installation might be a ten section unit in which ten I.S. machines produce glass bottles. Thus, ten transfer mechanisms would be required to transfer those bottles to the conveyor. The order in which the ten mechanisms are activated, known as the firing order, must be controlled to prevent bottles from one section being transferred to the conveyor as bottles from a prior conveyor are passing.

In the embodiment shown in FIG. 1, each mechanism 10 transfers two bottles B from the associated dead plate to the moving conveyor. Thus for simplicity it is assumed that the I.S. machine produces two bottles per machine cycle. Of course, other numbers of articles could be produced every machine cycle and transferred together from the dead plate to the conveyor. For example, one, three or four articles could be produced by the I.S. machine and transferred one, three or four at a time from the dead plate to the conveyor.

Figure 2:
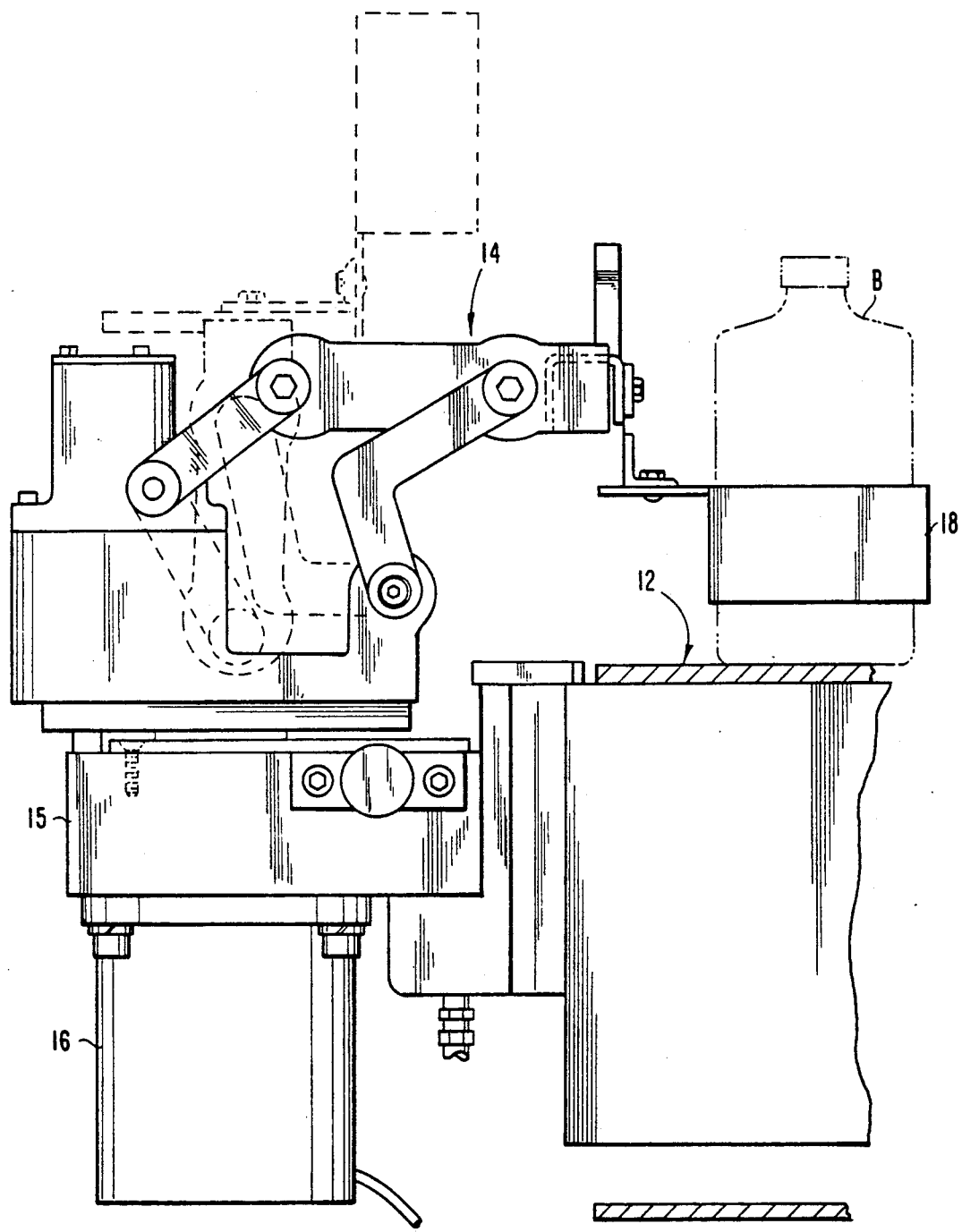
FIG. 2 is a side elevational view of the article transfer mechanism shown in FIG. 1 with the pusher arm extended to transfer a bottle to the take-away conveyor.

Each mechanism 10 includes a pusher arm 14, as shown in FIGS. 1 and 2. The pusher arm 14 is mounted on a rotatable turntable 15 which is driven in rotational or angular increments by a stepping motor 16. The pusher arm 14 includes a pair of fingers 18 for engaging the bottles B and urging them from the dead plate to the moving conveyor. The pusher arm 14 is driven by a fluid motor which extends and retracts the pusher arm during the cycle of motion of the transfer mechanism 10. The details of the pusher arm, turntable drive, and fluid motor system are described more fully in, U.S. Pat. No. 4,923,499 to Newkirk, particularly at Col. 3, line 20 to Col. 7, line 55, which disclosure is incorporated herein. However, the foregoing description is generally adequate for an understanding of the present invention, it being sufficient to understand that the article transfer mechanism 10, by way of its turntable 15, is rotated in stepwise increments by a stepping motor 16 through a 90° arc from the dead plate 11 to the moving conveyor 12.

It is understood that the speed profile of this angular motion is important to accelerate the bottles B from rest to roughly the speed of the moving conveyor by the end of the 90° sweep of the arm 14. It is also important that the speed profile of this rotational or angular sweep be controllable depending upon the size and shape of the bottles B to be transferred. Thus, thin and tall bottles require a different speed profile curve than wide and short bottles, in part due to the inherent instability of the tall, thin bottle as opposed to the short, wide bottle. If the initial acceleration is too great, the hot newly-formed bottles can be deformed. The bottles must be accelerated quickly and smoothly to the conveyor speed to maximize the rate of production of bottles B.

Figure 3:
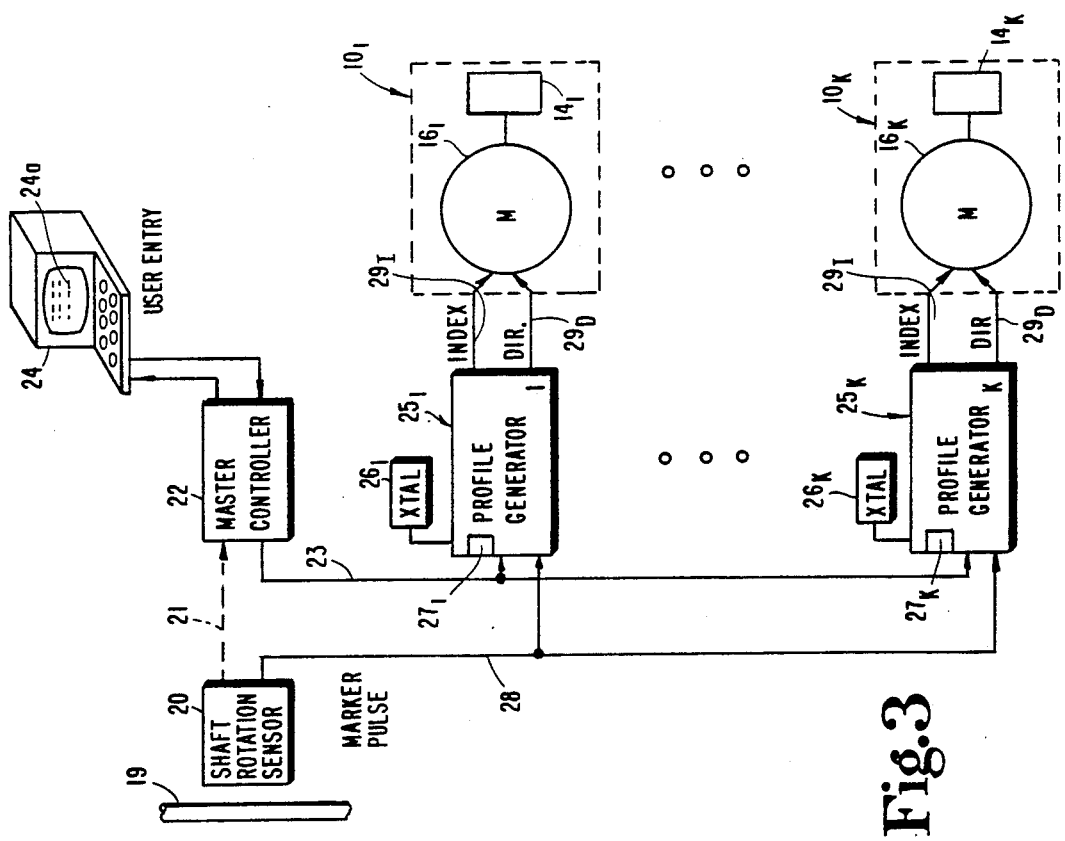
FIG. 3 is a schematic diagram of the article transfer mechanism of the present invention particularly illustrating the electronic circuitry of the mechanism.

The electronic control for each of the article transfer mechanisms $10_1$-$10_K$ is shown in schematic form in FIG. 3. The article transfer mechanisms 10 form only a part of an otherwise conventional processing machine, such as an I.S. machine which includes other well known mechanisms for forming and operating on the bottles. The processing machine includes a number, K, of I.S. machines and a corresponding number of transfer mechanisms $10_1$-$10_K$. All of the components of the I.S. machines, including the conveyor 12, are driven by a main drive shaft 19. In the preferred embodiment, a shaft rotation sensor 20 is used to generate a marker pulse on data bus 28 for each revolution of the main drive shaft 19. The electronic control system includes a master controller 22 which is preferably a microcontroller, but may be a microprocessor. The master controller 22 receives inputs from a user data entry terminal 24 and sends output data to the terminal 24 for display on the screen 24a. The master controller 22 also provides data to a number of profile generators $25_1$-$25_K$ through data bus 23.

Each profile generator $25_1$-$25_K$ controls the rotation of a corresponding article transfer mechanism $10_1$-$10_K$. Each of the profile generators preferably includes a microcontroller which includes a fixed memory, such as a ROM, containing a stored algorithm used to determine the dwell time for the stepping motor $16_1$-$16_K$ corresponding to the particular article transfer mechanism $10_1$-$10_K$. The profile generators $25_1$-$25_K$ are driven by a crystal oscillator 26 which provides periodic timing signals to the profile generator for performing the time keeping functions. Each profile generator receives the marker pulse on data bus 28 and each generator includes a main shaft period sensor 27 which determines the rotational period for the main drive shaft 19. The main shaft period sensors $27_1$-$27_K$ continually monitor the time between marker pulses (received on bus 28) as measured according to the time base provided by each crystal oscillator $26_1$-$26_K$ to generate a value corresponding to the main shaft period or cycle time for use in several calculations described herein.

In U.S. Pat. No. 4,923,499, a speed profile for each stepping motor is essentially contained within a PROM in which the dwell time between steps of the stepping motor is stored. Consecutive steps of the stepping motor are spaced in time by the amount of time required for a speed counter to reach the value of each data word stored within the PROM. Changes in speed profile for a given article transfer mechanism requires selection of up to four groups of memory locations within the PROM corresponding to four different speed profiles. The present invention differs from this prior system in that the dwell times between steps of the stepping motor are calculated "on the fly" using an algorithm or equation that is contained within each profile generator $25_1$-$25_K$. This algorithm calculates the specific dwell time between motor steps so that when the dwell period times out, the microcontroller outputs an index signal on line $29_I$ (index) to cause the motor to index or rotate through one step of the motor. The PROM also includes a data bit corresponding to the direction (forward or reverse) of the pusher arm, and consequently the motor, based upon the angular position of the arm. The microcontroller outputs a direction signal on line $29_D$ (direction) according to the direction data bit in the PROM, which direction signal issues to the stepping motor controller. In the preferred embodiment, a high or binary one (1) on direction line $29_D$ energized the forward windings of the motor, while a low or binary zero (0) energizes the reverse windings.

Figure 4:
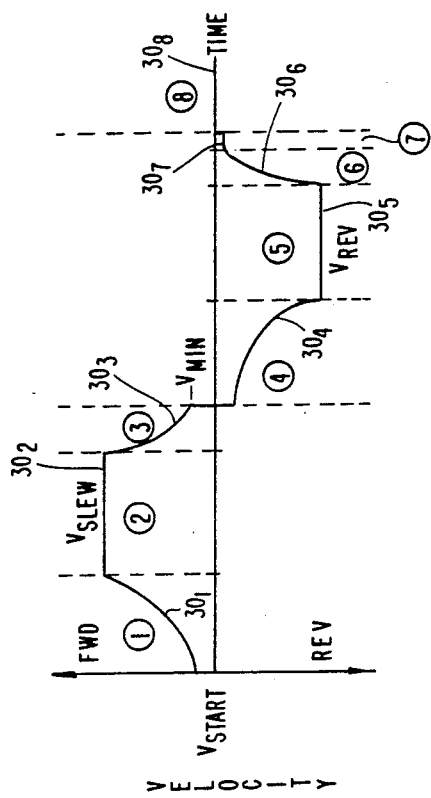
FIG. 4 is a diagram of the motion segments for the motion of the pusher arm of the article transfer mechanism of the present invention.

As shown in FIG. 4, the motion of a pusher arm, such as arm 14 (FIGS. 1 and 2), can be reduced to a sequence of transfer motion segments. The stepping motor is initially indexed so that the pusher arm, and ultimately the ware transferred by the arm, moves according to a velocity profile that conforms to the non-linear velocity-versus-time curve of first motion segment $30_1$. This first motion segment $30_1$ takes the transfer arm from the home position at rest to a maximum speed, designated as $V_{slew}$, which corresponds to the speed of the conveyor belt in the preferred embodiment. Once the transfer arm has been accelerated to $V_{slew}$, the stepping motor is indexed at constant intervals so that the pusher arm moves at a constant velocity $V_{slew}$ until the first bottle is pushed onto the moving conveyor belt. This velocity-versus-time curve is represented by the horizontal portion of the transfer motion segment $30_2$.

If the I.S. machine includes a single gob distributor, only a single bottle will be transferred by the pusher mechanism from the dead plate to the moving conveyor. Once that bottle is fully situated on the conveyor, the pusher arm can begin its deceleration, represented by the non-linear curve $30_3$. On the other hand, if a double or triple gob distributor is being used, two or three bottles will be transferred by a single pusher arm. In this instance, the pusher arm must continue at the conveyor belt speed $V_{slew}$ until the last of the bottles is up to speed on the moving conveyor belt. Thus, the amount of time that the pusher arm is moving at the $V_{slew}$ is a function of the number of bottles (or number of gobs per section) to be transferred onto the moving conveyor. Once the last of the bottles is on the conveyor, the fingers 18 of the pusher arm 14 are retracted and then the arm 14 is decelerated along the transfer motion segment 30₃. The fingers 18 are retracted as soon as possible once the last bottle is at conveyor belt speed so that the fingers do not interfere with bottles advancing along the conveyor from a prior I.S. machine section.

Ideally the pusher arm has been decelerated to a specific minimum velocity, $V_{min}$, at the end of the 90° rotation of the pusher arm 18. At this position the profile generator 25 then sends a reverse motion signal along line 29$_D$ to the stepping motor 16, thereby reversing the direction of rotation of the motor and motion of the pusher arm. The pusher arm is then accelerated according to the curve of the transfer motion segment 30₄ until it reaches the maximum reverse velocity $V_{rev}$ in the reverse direction. The reverse velocity $V_{rev}$ can be the same as the forward sweep slewing velocity $V_{slew}$. However, in practice the reverse slewing velocity is greater than the forward velocity since the forward slewing velocity $V_{slew}$ is calibrated to correspond to the take-away conveyor belt speed. On the return or reverse rotation, the pusher arm can rotate at its maximum speed—that is, at the maximum speed capability of the stepping motor, microcontroller and motor control circuitry. Thus, if the stepping motor is capable of 1000 half-steps per second, the maximum reverse velocity $V_{rev}$ can correspond to this maximum stepping motor rate.

The pusher arm travels at this maximum reverse velocity $V_{rev}$ along transfer motion segment 30₅ to return the arm to the home position adjacent the dead plate. When the pusher arm nears the home position, it is decelerated along transfer motion segment 30₆ until it is very close to the home position. The transfer motion velocity versus time curve includes a creep segment 30₇ which rapidly reduces the velocity of the pusher arm so that it does not contact the stops at the home position with excessive force. It has been found in practice that if the pusher arm moves toward the home position too rapidly it will bounce off mechanical stops (not shown), rather than coming to rest exactly at the home position. Thus, the creep motion segment 30₇ is provided to minimize the risk of the transfer arm bouncing off of the mechanical stops. On the other hand, the arm velocity must be sufficient to move the arm all the way to the stops at the home position.

Once the pusher arm is at the home position, the profile generator withholds index signals to the stepping motor for a period of time until the I.S. machine cycle is complete (that is, until the main drive shaft 19 has completed one rotation). Thus, the last of the transfer motion segments 30₈ is a rest condition in which the pusher arm sits dormant at the home position until a marker pulse signal is received from the I.S. machine main shaft on data bus 28 indicating that a new cycle is about to begin. Each profile generator receives the marker pulse at the same time but the pusher arms do not begin moving along the transfer motion curve of FIG. 4 at the same time. The beginning of motion of the arms of mechanisms 14₁-14$_K$ is delayed according to a predetermined firing order to insure an orderly procession of bottles on the conveyor. The firing order delay time is stored by the profile generator to measure a preset number of clock signals from the crystal oscillator 26 until the motion sequence is commenced.

It has been discovered as part of the present invention that the non-linear transfer motion segments 30₁, 30₃, 30₄ and 30₆ of FIG. 4, can be represented by a particular equation or algorithm. The algorithm contains a number of coefficients and exponents that can be modified according to user inputs to shape the transfer motion segments to accommodate different bottle or ware types, different I.S. machine set-ups and different conveyor belt speeds. The preferred algorithm takes on the following form:

$$P = AN^x + BN^y + C \tag{I}$$

In Equation I, P is the dwell time or period before the next step of the stepping motor, C is the period corresponding to an initial or starting velocity, x and y are exponents entered by the user, and N is the incremented number for the current step within a particular transfer motion segment. The dwell time P calculation of Equation I is performed "on the fly" by the profile generators 25₁-25$_K$. For each step of the stepping motor (or each signal on line 29$_I$) the value N is incremented and the value of P recalculated. These calculations continue until the particular transfer motion segment is completed.

Each of the non-linear curves 30₁, 30₃, 30₄ and 30₆ can have a different set of coefficients A, B and C, and a different set of exponents, x and y. The coefficients A and B are a function of the total number of steps $N_t$ for the particular transfer motion segment, the period of the maximum velocity $(1/V_{slew})$, designated as $S_p$ and the exponents x and y. The coefficients are determined in the preferred embodiment by the following relations:

$$B = x(S_p - C)/N_t^y(x - y) \tag{II}$$

$$A = -B(y/x)N_t^{(y-x)} \tag{III}$$

The period of the slewing speed $(V_{slew})$ is a function of the speed of the conveyor belt, certain mechanical characteristics of the transfer mechanism, and certain characteristics of the stepping motor, which are input by the I.S. machine operator through the data entry terminal 24. In the preferred embodiment, these values include:

1) the number of I.S. sections (1, 2, 3, etc.) or pusher arms (14) producing and transferring bottles onto the conveyor belt each machine cycle;
2) the ware spacing, which corresponds to the distance along the conveyor between each section of the I.S. machine—that is the window size that the bottles transferred from each section occupies on the conveyor belt. Ware spacing is measured from the front of the front bottle in one section to the front of the front bottle in an adjacent section;
3) the arm radius of the pusher arm 14; and
4) the gear ratio between the stepping motor 16 and the pusher arm 14.

Each of these factors are fixed for a given I.S. machine set-up but can be varied with each new set-up. In one specific example, a ten section triple gob system has a ware spacing of 10½ inches, a pusher arm radius of 10¾ inches and a gear ratio of 3:1.

The speed of the conveyor belt, or the belt speed, can be determined from the following equation:

Belt speed = (no. of sections) * (ware spacing)/
(cycle time), where the cycle time is the period -continued
of one revolution of the master shaft 19.

As previously indicated, the main shaft period sensors $27_1$-$27_K$ of each of the profile generators 25 measure the period of rotation for the master shaft, which period corresponds to the cycle time for use in the belt speed calculation. This belt speed calculation is generally an estimate of the actual conveyor belt speed based upon the I.S. machine cycle time and certain known characteristics of the I.S. machine set-up. Alternatively, the belt speed may be determined directly by a belt speed sensor associated with the conveyor belt. The belt speed sensor would then directly feed a belt speed signal to each of the profile generators $25_1$-$25_K$ for use in later calculations.

Once the conveyor belt speed has been determined, it is then necessary to determine the maximum speed for the pusher arm at the end of its initial sweep-out. The maximum speed of the pusher arm in revolutions per second is determined by the following relationship:

Pusher Arm Rev/Sec=Belt Speed *1/($2\pi$* arm radius).

It is also necessary to relate this maximum rotational rate of the pusher arm to the speed of the stepping motor, since each of the profile generators are producing dwell time index signals directly to the stepping motor. For a stepping motor of one specific embodiment, each half-step of the stepping motor corresponds to 0.9°, since there are 400 half-steps of the motor per each 360° revolution. The 0.9° half-step of the motor is a fixed characteristic of a given stepping motor which may vary depending upon the type of stepping motor used. The motor speed for the specific embodiment is then:

$$\text{Motor speed } V_{slew} = \frac{1}{S_p} = 400 \text{ half steps/rev * gear ratio * pusher arm rev/sec}$$

Or in other words, the inverse of the slew period, which corresponds to the maximum stepping motor speed, is given by the equation:

$$(IV) \frac{1}{S_p} = \text{(no. of sections * ware spacing * gear ratio * 400 half-steps)}/(2\pi \text{ * arm radius)(cycle time)}.$$

This value for the slew velocity period $S_p$ is then used to calculate the particular coefficients A and B for each of the transfer motion segments $30_1$, $30_3$, $30_4$ and $30_6$ using Equations II and III above. It should be noted that while the described stepping motor is capable of 400 half-steps per full rotation, the motor may be microstepped to permit smaller index increments.

The master controller 22 and each of the profile generators $25_1$-$25_K$ include microcontroller routines that are activated once the system is powered up. In each of the profile generators $25_1$-$25_K$, a RAM, includes eight tables corresponding to each of the eight transfer motion segments $30_1$-$30_8$ FIG. 4. In each of these tables is stored the coefficients A and B, for the motion equation (Equation I), the total number of steps $N_T$ for each segment, the initial velocity at the beginning of each motion segment, and a flag which indicates whether the particular motion segment is accelerating, decelerating, moving at the maximum speed $V_{slew}$, moving forward, moving in reverse, or remaining at rest (during the shut-down segment $30_8$). In the case of the motion segments $30_2$ and $30_5$, the A and B coefficients are ignored so that the stepping motor, and therefore the pusher arm, is traveling at the initial velocity for the motion segment, which equals the final velocity for the preceding motion segment, $30_1$ ($V_{slew}$) and $30_4$ ($V_{rev}$), respectively. Similarly, the creep segment $30_7$ does not require A and B coefficients since the motion over that brief time period is not based upon the given equation in the preferred embodiment.

The operation of the electronic system of the present invention is governed by software routines stored in the master controller 22 and the profile generators $25_1$-$25_K$. The controller and generators can each include a microcontroller chip on which the software routines are stored. In the preferred embodiment, the microcontroller chip is one of the Intel 8032 family, although other microcontrollers may be sufficient. The microcontrollers are driven by separate clocks, such as crystal oscillator $26_1$-$26_K$ for the profile generator. In the preferred embodiment, the oscillators have a frequency of 12 MHz which is stepped down to 1 MHz by the microcontroller. All the microcontroller timekeeping functions are kept on this time base. The software routines proceed as described below, with reference to the flowchart of FIG. 5.

When the I.S. machine, the master controller and the profile generators are initially energized, the master controller 22 reads data entered by the I.S. machine operator at the terminal 24 (Step 51). In the preferred embodiment, the user inputs include number of sections, number of gobs per section, ware spacing, starting velocity of the stepping motor, number of steps in each transfer motion segment $30_1$-$30_8$, x and y exponents, pusher arm radius and gear ratio. Other data can be user input for more sophisticated features of the invention to be discussed herein.

The controller 22 uses the inputs to precalculate values for use in the coefficients A and B and the motor speed calculations of Equations II-IV above (Step 52). Certain portions of these calculations can be determined in advance because they are based on known constants or user input values. For instance, the slew velocity period $S_p$ can be reduced to a constant times the cycle time in the master controller because all of the variables in Equation IV except the cycle time are user input at the terminal 24 and do not change during I.S. machine operation. The cycle time is determined by each profile generator and can change as the I.S. main drive shaft 19 speeds up or slows down. For Equations II and III the values of $x/(x-y)$, $(y/x)$ and $(y-x)$ can be precalculated since the exponents x and y are user-entered and do not change during the operation of the I.S. machine in a particular set-up.

These precalculations are sent to each of the profile sections in which the final A and B coefficients are calculated (Step 53). Delegating these partial calculations to the master controller improves the calculation time of the profile generators 25 by removing certain unchanging calculations from the "on-the-fly" profile calculations made by the generators. The profile generators 25 store the partial calculations of A and B in temporary memory.

In the next step (Step 54), each of the profile generators $25_1$-$25_K$ determine the cycle time or period by way of a first timer interrupt routine in the software that interrogates the shaft rotation sensor to determine the clock time for one rotation of the main shaft 19. The cycle time is used to calculate the maximum pusher motor speed $V_{slew}$ and the A and B coefficients for the Equations II-IV above.

In addition, the cycle time is used to determine the offset start time for each section of the I.S. machine. In the operation of a typical I.S. machine, each section corresponding to a different transfer mechanism $10_1$–$10_K$, starts at a different time in relation to an arbitrary zero point for the main shaft rotation. Thus, a first pusher may be started immediately at the zero point, while the next pusher downstream along the conveyor belt is started after a specific time interval so that the bottles are transferred onto the conveyor belt in an orderly fashion. Thus, the start time and firing order of each section must be offset by a predetermined user entered time period. In the preferred embodiment, the amount of offset is entered by the user in terms of degrees of main shaft rotation from the zero degree point. A software timer interrupt routine (Step 56) in each profile generator receives the offset start time data from the master controller and calculates the necessary clock time delay corresponding to the degree offset. This second timer interrupt routine generates a signal to commence the sweep out motion once the interrupt routine times out.

In a specific example, a first section may be started after 10° of main shaft rotation, while the next adjacent section is started after 30° of main shaft rotation. For a ten section machine, the section offsets are fairly complex but relatively easy to determine by one skilled in the art, at least empirically, so that the bottles being transferred for each section meld smoothly into the flow of bottles along the conveyor.

Prior to the second timer interrupt routine (Step 56), the calculated values for $V_{slew}$, A and B are stored in the transfer motion segment tables described above for each of the eight segments of transfer motion for a particular section pusher arm (Step 55). Each of these values are recalculated with each new I.S. machine cycle. The motion segment tables also include the total number of steps for each segment based on data input at the terminal 24. The initial velocity for each segment is known based on the assumed shape of the motion curve, although these values could also be user-entered (such as the initial velocities for the first segment of the forward and reverse motions). The tables also include flags defining the speed and direction of pusher motion. For instance, segments $30_1$–$30_3$, are forward motion segments, segments $30_4$–$30_7$ are reverse, segments $30_2$ and $30_5$ are at $V_{slew}$ and segment $30_8$ is shut down. These forward/reverse motion flags are provided on line $29_D$ to the stepping motor controller as previously described.

The marker pulse on data bus 28 is continually monitored by each profile generator. If a marker pulse indicating the start of a new machine cycle is not received by a particular profile generator, an error message is issued and displayed on screen 24a, although the section continues to move through its specific motion segments. If the marker pulse is lost, the section continues for two cycles using the previous I.S. machine cycle time value and corresponding calculated $V_{slew}$. These two additional cycles permits the transfer mechanism to clear glassware that may have been newly formed on the I.S. machine deadplate. At the end of the two cycles, the section shuts down and resumes operation only upon receipt of a new marker pulse. Once the marker pulse is received, the second timer interrupt routine in the software (Step 56) is initiated to count to the section offset time. When the section offset time elapses, a third timer interrupt routine begins for the dwell time period calculation.

The dwell time period calculation produces a value that is stored in the third timer interrupt so that when the interrupt times out an index signal is sent to the stepping motor controller 16. When the interrupt routine commences, it retrieves the coefficients A and B and the initial velocity from the motion segment table corresponding to the particular motion segment, in this case segment $30_1$. The period P is calculated according to Equation I above (Step 57). The value for the period P is loaded into the third timer interrupt. The timer routine counts clock signals from the crystal 26 until the value for the particular dwell period has been reached. Once the third interrupt times out, the index signal is sent to the stepping motor controller 16 (Step 58). The step counter for that particular motion segment, that is the value of N, is also incremented (Step 59). If the newly incremented step count equals the total number of steps for the particular transfer motion segment $30_1$–$30_8$ (which number of steps is entered by the user) (Step 60), the step counter is cleared and the profile generator is directed to the next motion segment table entry (Step 61). If the newly incremented value of N is less than the total number of steps for the segment, the dwell-time interrupt loop is restarted and control is returned to Step 57 of the flowchart of FIG. 5.

The equation or algorithm used to determine the dwell time periods before indexing the stepping motor correlates to a calculation of the pusher arm motion "on the fly"—that is, the stepper motor dwell period is recalculated for each incremental step through for a given transfer motion segment. For instance, on the first step the period for the initial acceleration segment $30_1$ will be the starting velocity C entered by the user. It should be noted that C corresponds to the motor velocity period for consistent units. The current step number is zero (0) with the initial motion, so the A and B coefficients are not part of the period equation. For most applications, the starting velocity period will be equal to the minimum velocity $V_{min}$ for the stepping motor. The minimum velocity is calibrated based upon the type of bottle or ware being transferred to the conveyor belt. For instance, a larger heavier bottle can withstand a greater initial velocity than a smaller lighter bottle. The smaller bottle is more likely subject to deformation or excessive movement from the dead plate if the initial velocity $V_{min}$ is too great. On the other hand, if the initial velocity is too slow, the pusher arm has difficulty moving a heavier larger bottle. Thus, the $V_{min}$ is input by the user depending upon the particular setup for the I.S. machine and pusher.

Once the dwell period for the initial indexing of the stepping motor has elapsed, the current step is incremented to a value of one (1) and the equation for the period of the next dwell period is equal to the sum of the A, B and C coefficients ($P = A*1^x + B*1^y + C$). Once that dwell period has timed out in the interrupt routine and the stepping motor rotated through another step, the current step counter N is again incremented to a value of two (2) so that the next dwell step period P is equal to $A*2^x + B*2^y + C$. The solution of this equation for the period requires evaluation of exponential expressions.

In the preferred embodiment, the exponential terms $2^x$ and $2^y$ are obtained from a table look-up, rather than calculated, in order to save calculation time for the microcontroller of the profile generator 25. The table look-up includes a matrix of step numbers 0 through 255 (the mantissa) and a matrix of exponents 0.0 through 1.9. The range of exponents falls within the types of equations demonstrated through experimentation to accommodate most types of ware. Other exponential values greater than 1.9 or less than 0.1 may be included in the table look-up as required to shape the motion segment curve.

Figure 5:
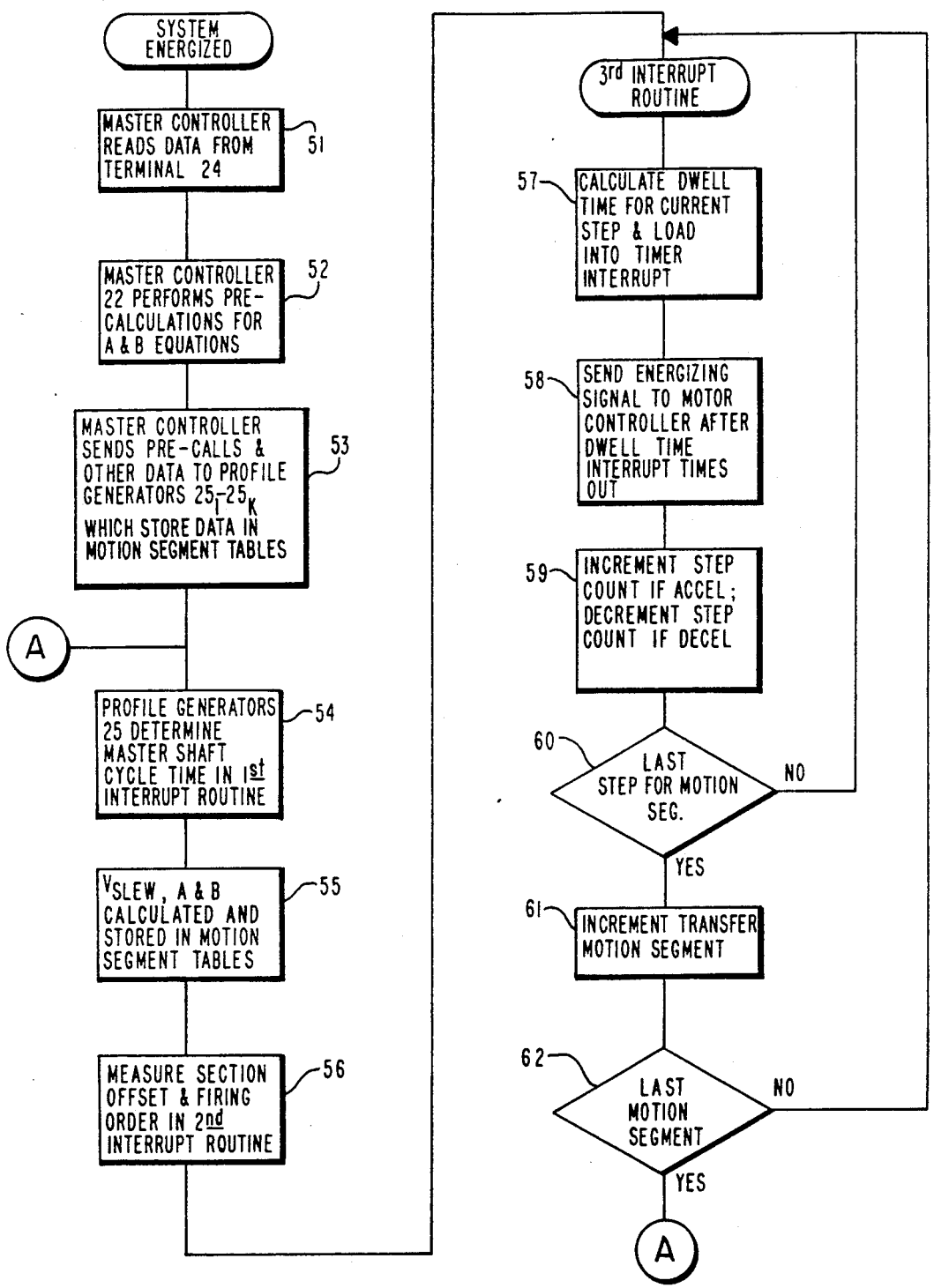
FIG. 5 is a flowchart depicting the steps, according to a program maintained in the microcontroller of the electronic circuitry of the article transfer mechanism, for controlling the motion of the pusher arm according to a velocity profile.

Returning again to the flowchart of FIG. 5, in Step 60 it is determined whether or not the last step of the transfer motion segment has been reached. That is, when the incremented value of $N=N_T$ (i.e. the total number of steps for the segment) the third timer interrupt transfers control outside of the dwell time calculation loop to Step 61. In Step 61, the transfer motion segment indicator is incremented to the next transfer motion segment. In the next step, Step 62, that incremented segment number is compared to the number of the last segment. Thus, if the stepping motor has not yet been moved through each of the eight transfer motion segments $30_1$-$30_8$, control is returned to the beginning of the third timer interrupt routine (Step 57). On the other hand, if the pusher arm has been moved through each of the transfer motion segments and has then returned to the home position, control is transferred back to the beginning of the first timer interrupt routine at Step 54 in which the masster shaft is interrogated to determine the cycle time. The microcontroller software retains the values of the used-entered data as each of the profile generators $25_1$-$25_K$ continues to loop through each of the Steps 54-62 during the operation of the I.S. machine in a particular set-up. If the I.S. machine set-up is to be changed, for instance to change the type of bottle being formed and transferred to the conveyor, the entire system including the master controller 22 and the profile generators $25_1$14 $25_K$ can be de-energized and then re-energized. The program flow returns to step 51 to perform the proper calculations with the new data. It is understood that the interrupts shown in FIG. 5 as occurring sequentially may occur asynchronously and at any time between Steps 57-62. In this case, the microcontroller retains any information calculated during a particular interrupt routine until a stepping motor move or index is complete.

It is apparent from the flowchart of FIG. 5 and the foregoing description that the pusher arms $14_1$-$14_K$ and the stepping motor $16_1$-$16_K$ are not directly synchronous with the main shaft 19 rotation of the I.S. machine. That is, as the I.S. machine main shaft 19 speed varies during a particular pusher cycle, the speed with which the transfer arm moves out to the 90° position and back to the home position does not change. The dwell period calculation of Equation I performed in the third timer interrupt routine produces a value that is fed into a timer interrupt comparator. The timing signals from the oscillator crystals $26_1$-$26_K$ are also provided to the timer interrupt comparator so that when the requisite amount of time has elapsed according to the crystal oscillator as compared with the dwell period time P determined by Equation I, an index signal is produced and transferred to the stepping motor controller 16. Thus, the amount of real time spent in each of the transfer motion segments $30_1$-$30_K$ is determined by the timing signals generated by the crystal oscillators $26_1$-$26_K$, rather than directly from the rotational rate and position of the main shaft 19.

In this non-synchronous system, the main shaft rotational rate is relevant to the software routines of the profile generators $25_1$-$25_K$ insofar as it is used to generate an estimate of the conveyor speed. The conveyor speed is used to calculate the slewing speed of the stepping motor and therefore the pusher arm, so that the speed of the pusher arm and the bottle being transferred by the arm will match the speed of the conveyor at the end of the 90° rotation from the home position of the pusher arm. Consequently, as the main shaft rotation rate increases, the conveyor belt speed increases, and the maximum speed of the stepping motor and pusher arm also is increased to match the new conveyor belt speed. The minimum or starting velocity of the stepping motor and pusher arm remains unchanged as the main shaft 19 rotational rate changes.

On the other hand, the A and B coefficients used in Equation I will change according to the change in $V_{max}$ or $V_{slew}$. It will be recalled that $V_{slew}$ is determined by the cycle time so that the maximum speed of the stepping motor and the pusher arm will equal the speed of the conveyor belt at the end of the 90° pusher cycle. The A and B coefficients are dependent upon the $V_{slew}$ as shown in Equations II and III. Thus, changes in the conveyor belt speed and in $V_{slew}$ result in changes in the dwell period P calculated according to Equation I, since the A and B coefficients are modified. Nevertheless, the rate at which the new dwell period P is calculated remains unchanged as the I.S. master shaft speed changes since the dwell period is measured according to the crystal oscillator frequency, as discussed above.

In one preferred embodiment of the invention, each of the profile generators $25_1$-$25_K$ each includes a software routine that stores a current value of the main shaft cycle time as determined by the main shaft period sensor $27_1$-$27_K$. As indicated above, the main shaft period sensors 27 continually monitor the time between marker pulses received along data bus 28 from shaft rotation sensor 20. The shaft period sensors 27 ascertain the number of clock pulses from the crystal oscillator 26 and store that value in a memory location within the profile generator. On the next machine cycle, that is on the reception of the next marker pulse, an updated value for the main shaft rotation rate or cycle time is calculated by the main shaft period sensor 27. That new value for the main shaft cycle time is compared to the value of the last main shaft cycle to ascertain whether the main shaft has increased or decreased in rotational speed. If the comparison between the two main shaft cycle times is within plus or minus 5%, no error is detected, since it is assumed that the main shaft may vary in rotational speed within those limits. However, if a greater than 5% variation is detected between consecutive cycle times, that is between consecutive marker pulses, an error is indicated.

The error can be dealt with in several ways. In one response, the error is noted and an error message is transmitted from the profile generators to the master controller 22 which displays an error message on the monitor 24a for review by the I.S. machine operator. In an alternative approach, an error bit can be set and the main shaft cycle time monitored for a second or third marker pulse and the error bit will be incremented according to each new main shaft cycle that does not conform to the originally calculated main shaft cycle time. When the error bit reaches a predetermined value, such as two or three error designations, an error message is transmitted to the master controller and ultimately to the user reviewable screen 24a. At that point, it is apparent that at least a semi-permanent change in the I.S. machine main shaft speed has occurred which would necessitate some action by the I.S. machine operator.

In the preferred embodiment, the A and B coefficients, and the $V_{slew}$, are recalculated with every reception of the marker pulse. Alternatively, or in conjunction with either of the error message procedures outlined above, each of the profile generators 25 can recalculate a new maximum velocity $V_{slew}$ when an error is detected so that each of the pusher arms will achieve the proper speed at the end of the 90° sweepout cycle. This recalculation can be triggered immediately upon the detection of an error or can be triggered only after a certain number of cycles at the new cycle have been detected, as determined by the error bit described above. Thus, if it is determined that the main shaft is rotating at a different rate for two or more cycles, for instance, it is important that the pusher arm maximum velocity $V_{slew}$ be recalculated so that the pusher arm's speed can conform to the conveyor belt speed.

In this alternative approach, a separate routine within the profile generator software is initiated to calculate a new set of coefficients A and B for each of the transfer motion segments while the profile generator continues to cause the pusher arm to move according to the currently known transfer motion equations. The recalculation for the coefficients A and B, as well as the transfer of these values into the transfer motion segment tables, will normally occur within one machine cycle, that is between consecutive I.S. machine marker pulses. Once the recalculations are complete, the new values can be transferred into the transfer motion segment tables on reception of a marker pulse along data bus 28. These new values would then be utilized in the dwell period calculations on the next consecutive I.S. machine cycle, that is when another marker pulse is received. Thus, in this preferred embodiment, any significant error in I.S. main shaft cycle time requires at least two I.S. machine cycles before the pusher arm dwell period calculations are corrected.

It can be noted that the updated dwell period calculated according to Equation I is a function of the current position of the pusher arm during the 90° sweep cycle. That is, given the total number of steps of the stepping motor and pusher arm, the total rotational distance traveled by the stepping motor can be determined simply by multiplying by 0.9° per step. Thus, if the stepping motor has moved a total of 50 steps, it has also moved through an angle of 45° (50×0.9). The 50 steps of motion of the stepping motor is directly related, via step down gearing, to the actual angular position of the pusher arm. Thus, the dwell period is a function of the current position of the pusher arm, rather than of the current position of the I.S. machine's main shaft.

Figure 6:
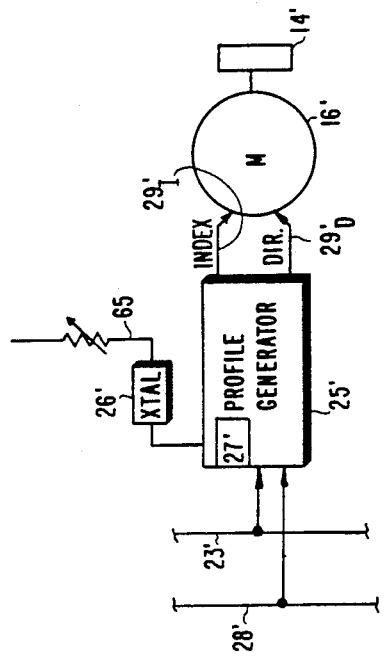
FIG. 6 is a schematic diagram of an alternative embodiment of a portion of the electronic circuitry of the article transfer mechanism of the present invention.

In an alternative embodiment of the present invention, as illustrated in FIG. 6, a profile generator 25' includes each of the components 23', 27', 28' and 29' which correspond to the non-primed numbered components of the system shown in FIG. 3. The profile generator 25' controls the operation of the stepping motor 16' which moves the pusher arm 14'. The timekeeping functions of the software routines of the profile generator 25' are controlled by a crystal oscillator 26'. In this alternative embodiment, the crystal oscillator 26' is a controllable or manually variable oscillator which includes a potentiometer 65. The potentiometer 65 can be manipulated by the I.S. machine operator to vary the timekeeping frequency of the crystal oscillator 26'. Thus, as the I.S. machine shaft 19 increases or decreases in rotational speed, the actual speed of the stepping motor M and pusher arm 14' can be controlled by varying the frequency of the timekeeping functions in the software routine stored in the profile generator 25'.

As indicated above, the rate at which the dwell period P is timed out in the third interrupt routine of the dwell period calculation loop is controlled by the frequency of the crystal oscillator 26'. When the oscillator frequency is increased by the potentiometer 65, the rate at which the timing signals are generated by the oscillator and transferred to the software routine of the profile generator increases. Thus, the real time required for the third timer interrupt to time out for the calculated dwell period P is shortened and the stepping motor 16' moves more quickly in real time. It should be understood, however, that the dwell period P calculated according to Equation I is not changed by the change in the oscillator frequency effected by the manually controlled potentiometer 65 (but does change according to the change in main shaft rotational speed 19 as described above).

Figure 7A:
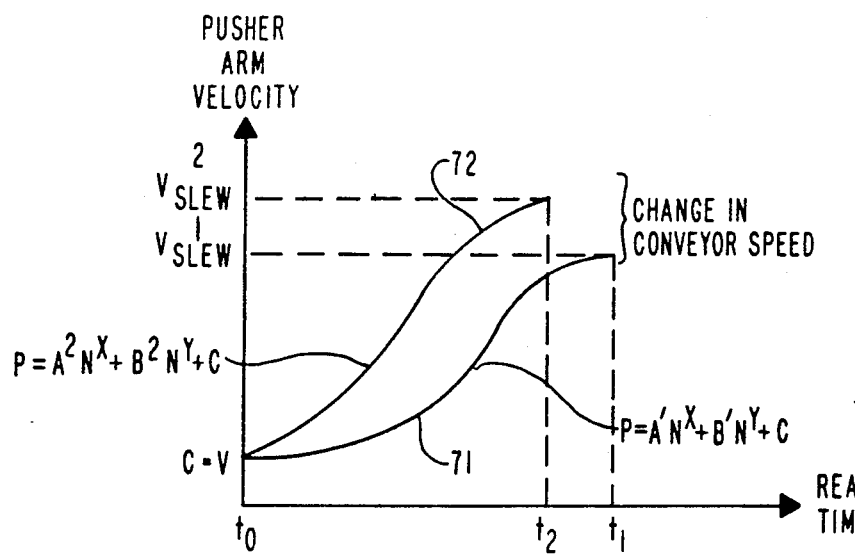
FIG. 7A is a diagram graphically illustrating changes in the velocity profile for one motion segment of the pusher arm of the article transfer mechanism of the present invention, the changes occurring in relation to a change in conveyor speed.

Changing the I.S. machine main shaft rotational rate changes the dwell period P calculated for the subsequent cycle of the I.S. machine as well as the real time for the 90° sweepout. Changes in the crystal oscillator frequency or timing signal rate expands or contracts the real time for the sweepout while the calculated period P remains unchanged. This feature of the present invention is illustrated more clearly with reference to FIGS. 7A and 7B. In FIG. 7A, a change in the conveyor speed (which is directly related to the I.S. main shaft 19 speed) is illustrated. The time $t_0$ represents the real time at the beginning of motion of the pusher arm, while time $t_1$ represents the real time value at the time at which the bottle is on the conveyor and moving at the conveyor speed. The lower curve 71 represents the curve for the first transfer motion segment based upon a first conveyor speed. The coefficients $A^1$ and $B^1$ are calculated based upon the particular cycle time corresponding to that first conveyor speed. At time $t_1$, or the end of the 90° sweepout, the pusher arm is moving at a velocity $V_{slew}{}^1$ which corresponds to the first conveyor speed. As the conveyor speed increases (i.e., as the I.S. main shaft 19 speed increases), the maximum speed of the stepping motor and pusher arm increases to $V_{slew}{}^2$ and to match the increased conveyor belt speed according to Equation IV above. In addition, the coefficients $A^2$ and $B^2$ change since the value for $V_{slew}{}^2$ is a component of the calculations for these coefficients of Equations II-III above. Increasing the cycle time of the I.S. machine decreases the dwell period P between motor steps which alters the shape of the pusher velocity curve and decreases the real time for the 90° sweep to time $t_2$. However, the start velocity $V_{start}$ is unchanged.

Figure 7B:
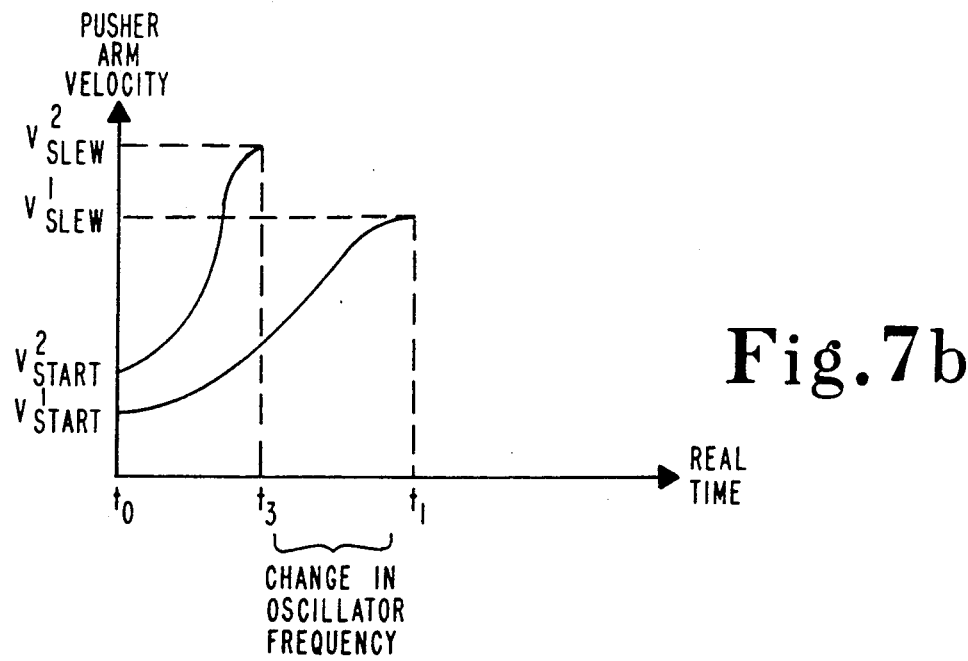
FIG. 7B is a diagram graphically illustrating changes in the velocity profile for one motion segment of the pusher arm of the article transfer mechanism of the present invention, the changes occurring in relation to a change in oscillator frequency.

On the other hand as illustrated in FIG. 7B, changes in the oscillator frequency cause a corresponding change in the start velocity as well as the real time in which the pusher arm moves from the home position to the full 90° rotation position. The calculation for the dwell period P does not change since the coefficients $A^1$ and $B^1$ are not a function of the oscillator frequency or of the real time required for the pusher arm to move through an entire sweep-out. However, since the oscillator determines the rate at which the dwell period is timed out, increasing the oscillator frequency proportionately increases all velocities calculated along the velocity profile and decreases the real time of the full 90° sweep to $t_3$.

Figure 8:
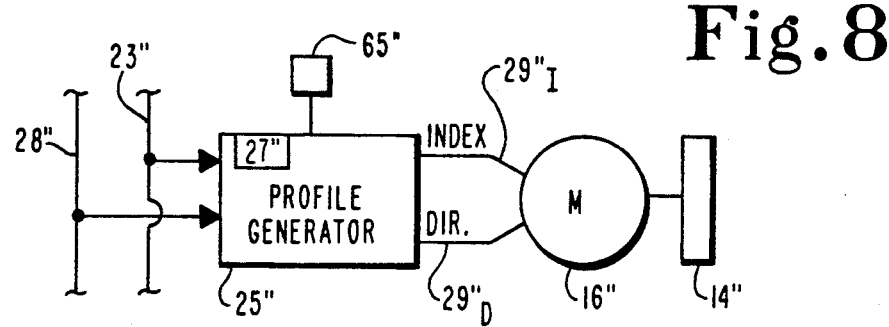
FIG. 8 is a schematic diagram of another embodiment of a portion of the electronic circuitry of the article transfer mechanism of the present invention.

In a third embodiment, shown schematically in FIG. 8, a profile generator 25" (which is identical in most respects to the generator 25) utilizes the internal clock 27" of the microcontroller to provide all time keeping functions for the generator, including the rate at which the dwell period is counted through. However, in a divergence from the previous embodiments, a manually variable element 65", such as a variable oscillator or digital potentiometer, is included which provides a signal to the microcontroller corresponding to a presumed value for the I.S. machine cycle time. Thus, the variable element 65" directly supplies the value for the cycle time used in Equation IV to calculate the slew velocity period, and ultimately the maximum forward sweep velocity $V_{slew}$. The addition of the variable element 65" breaks the tie with the I.S. master shaft 19 which calculates the I.S. cycle time based upon the timing between marker pulses. The variable element 65" eliminates the need for error protocol in the instance of a loss of the marker pulse, except to the extent that the I.S. master shaft rotation had been interrupted. This third embodiment of FIG. 8 maintains the start velocity of the pusher arm constant, yet permits user adjustment of the slewing speed.

The flexibility of the present invention is demonstrated by the three illustrated embodiments. This invention permits the I.S. machine operator to tailor the 90° motion according to a particular conveyor belt speed and a particular bottle being transferred from the deadplate to the conveyor. For instance, the maximum speed of the pusher can be changed to accommodate the speed of the conveyor belt as the I.S. master shaft speed is increased. However, the minimum speed of the transfer arm can be kept constant, regardless of the belt speed of final pusher arm velocity, in order to prevent undue shock loading to a bottle being moved from the deadplate. If the start velocity is increased as the maximum velocity $V_{slew}$ is increased, there is a risk that the pusher arm will attempt to move the bottle from rest on the deadplate to rapidly causing it to deform or buckle. The addition of the variable element 65" permits fine tuning of the pusher rotation velocity profile.

It should be understood that the present invention also contemplates eliminating the link between the $V_{slew}$ calculation and the I.S. machine main shaft rotational speed by establishing a fixed value for $V_{slew}$ that is determined in advance according to the particular I.S. machine setup. In this instance, the calculations for the A and B coefficients, and consequently the dwell period equation, would not change according to changes in the I.S. main shaft speed. In the absence of the link to the main shaft rotational speed, the real time rate at which the 90° pusher moves through its full 90° rotation can be varied with the oscillator and potentiometer arrangement described above with reference to FIG. 6. In addition, the value for $V_{slew}$ may be manually changed by the I.S. machine operator. In this instance, the master controller 22 can periodically or continuously interrogate the terminal 24 for new user entries. For example, the master controller 22 may interrogate the terminal 24 with each marker pulse received from the shaft rotation sensor 20 along line 21, shown in FIG. 3. After the master controller determines that a new value for the maximum velocity $V_{slew}$ has been entered by the I.S. machine operator, it can then send a signal along data line 23 to each of the profile generators $25_1-25_K$. Reception of new data along data bus 23 can trigger a recalculation of the A and B coefficients for creating the transfer motion segment tables stored in memory within each of the profile generators.

In the preferred embodiment, the profile generators 25 do not immediately register the change in $V_{slew}$ entered by the I.S. machine operator. In this embodiment, the changes in the calculation of the A and B coefficients occur during a first I.S. machine cycle after the new data has been received along data bus 23. The new values for the transfer motion segment tables can be stored in memory within the same machine cycle, that is before the next marker pulse along data bus line 28. If the new calculations for the A and B coefficients are occurring while a marker pulse is received by the profile generator, the new table values for each of the transfer motion segments would not be used in the dwell period calculation until the next marker pulse is received. Thus, at a minimum, the changes in the $V_{slew}$ as entered by the I.S. machine operator would not be manifested in changes in the dwell period calculation in each of the profile generators 25 until at least one additional marker pulse has been received from the shaft rotation sensor 20. That is, changes in the maximum velocity of the pusher arm are not manifested immediately in the middle of a cycle of the arm.

The I.S. machine operator is provided with a terminal 24 for entry of data defining the parameters of operation of the 90° pusher arms. In the preferred embodiment, the master controller 22 scrolls through a number of screens which permit and display data entered by the I.S. machine operator. The first screen shown in FIG. 9A, is the SYSTEM PROGRAM screen in which the particular system configuration and profile data are input by the operator. This system configuration and profile data are sent to each of the profile generator cards $25_1-25_K$ The SYSTEM PROGRAM screen 80 includes a JOB NUMBER 81 that can be entered by the I.S. machine operator to identify the particular job or I.S. machine setup. For instance, if the I.S. machine is set up for producing long neck bottles for a particular client, the job number may be assigned to reflect that particular system arrangement.

In another aspect of the present invention, each of the system program data can be stored in a secondary memory source according to the job number assigned to that array of data. Thus, if a glass factory knows that it will be producing long neck bottles for company A several times throughout a year, the system configuration data can be stored in a secondary memory medium to be recalled at a later date. This data can be stored onto a floppy disk or on an EPROM, or another suitable medium, that can be read by the master controller 22 which would pull up all of the information depicted on screen 80. machine operator input.

In the next portion of the screen 80, the SYSTEM CONFIGURATION 82 is established. The first value for the MASTER OFFSET is used to align the I.S. machine's mechanical 0° with the marker pulse signal generated by the shaft rotation sensor 20. This MASTER OFFSET value can be used by the main shaft period sensors 27 of each of the profile generators to offset the recognition by the profile generators of the marker pulse on data bus 28. The MASTER OFFSET value can assume a value between 0° to 359°. The MAS- TER OFFSET may be used, for instance, where the I.S. main shaft is also used to control the operations of a gob distributor in which the gob distributor is activated at the mechanical zero degree position while each of the conveyor pushers are to be started at some fixed interval after the main shaft zero degree position.

The SYSTEM CONFIGURATION section 82 of screen 80 also includes inputs for the NUMBER OF SECTIONS which is programmable from 6 to 12 sections, the NUMBER OF GOBS per section, which in the normal circumstance would vary between one and four, and the WARE SPACING. As described above, the WARE SPACING value sets the bottle spacing for each section. The ware spacing is not the bottle-to-bottle spacing, which is typically determined by the mechanical configuration of the pusher arm itself. Appropriately, the WARE SPACING value corresponds to a "window" size that all of the bottles from a particular section fills on the conveyor belt, as described above in connection with the discussion of the transfer motion equations I-IV.

The next section of screen 80 is the PROFILE DATA section 83. The PROFILE DATA section 83 can be broken into three subsections 83a-83c. In subsection 83a, the relative velocity values for operation of the stepping motor and motion of the pusher arm are entered. The value for START VELOCITY sets the initial starting velocity for the pusher. This value is programmable from 0.01 to 10.0 which represents a percentage of the maximum speed capability of the motor (10.0 being 100% of the stepping motor maximum speed). In the preferred embodiment, many of the user input velocities are in these relative terms. The maximum speed capability, that is the maximum speed at which the profile generator 25 and motor controller can drive the stepping motor, is determined by a program constant within the microcontroller. This program constant is a function of the amount of time required to perform the calculations in Equations I-IV and to advance through the steps of the flowchart in FIG. 5. In the preferred embodiment, this maximum rate corresponds to 1000 motor half-steps per second of realtime. Thus, the values entered by the user concerning relative velocities, such as START VELOCITY, represent a percentage of this 1000 half-steps/sec. In FIG. 9A, the value for START VELOCITY of 1.0 corresponds to 1.0/10.0 (or 0.1) of 1000 half-steps/sec., or stepping motor speed of 100 half-steps/sec.

As discussed above, lowering the value of START VELOCITY will exert less force on the bottles when the pusher arm fingers engage the bottles but will increase the amount of time required for the 90° pusher cycle. This START VELOCITY value corresponds to the initial velocity for the forward sweepout motion segment $30_1$ shown in the transfer motion segment curve of FIG. 4. The appropriate mathematics within the profile generator software is used to convert these relative values to the absolute period values calculated by Equation I for the stepping motor dwell period P. Alternatively, the START VELOCITY, along with the remaining velocities, can be entered in absolute terms, that is the absolute or actual velocity of the pusher arm as it begins or moves through the transfer motion segments.

The RETURN SLEW VELOCITY sets the speed at which the pusher arm returns to the home position from the 90° position of the arm, that is the speed at which the arm returns or moves from the conveyor back to the dead plate. The RETURN SLEW VELOCITY should be as fast as possible to minimize the move cycle time. Since no bottles are being transferred by the pusher arm in the return motion segment $30_5$, it is not essential to consider the impact of maximizing pusher arm velocity on bottles or other ware.

The MINIMUM VELOCITY term corresponds to the speed to which the pusher arm slows when it is switching from the 90° pusher forward motion segments to the return motion segments. That is, the MINIMUM VELOCITY is the value $V_{min}$ shown at the end of motion transfer segment $30_3$ and at the start of segment $30_4$ in FIG. 4. When the pusher arm is nearing the end of its 90° pusher cycle, the arm is moving at a certain MINIMUM VELOCITY and changes immediately to the reverse direction without stopping over the conveyor belt. If the pusher arm were to slow to a zero velocity, that is stop on the conveyor belt, there is risk that the arm would be contacted by bottles approaching from the prior sections of the I.S. machine. Thus, it is important that as quick as a transition be made as possible from the forward sweep of the pusher arm to the reverse return sweep of the arm. The MINIMUM VELOCITY must be as high as possible to insure a quick return of the pusher arm, yet this minimum speed is bounded by the capabilities of the stepping motor to reverse direction from that minimum speed. For instance, the inertia of the stepping motor and of the pusher arm will have some bearing upon the ability of the stepping motor to reverse direction from a certain $V_{min}$. In at least the preferred embodiments of the invention, it has been found that $V_{min}$ is equal to the start velocity used to begin the forward and reverse sweeps of the pusher arm.

The final velocity entered by the user is the CREEP HOME VELOCITY. This velocity occurs in the last moving step of the transfer motion segments, step $30_7$. This step occurs just before the pusher arm reaches the home position adjacent the dead plate. In one embodiment of the invention, a mechanical post is provided at the home position of the pusher arm so that the pusher arm can contact and rest against the home post when the arm has completed its full forward and reverse cycle. If the pusher arm is moving too quickly as it approaches the home post, it will "skid" into the post and possibly bounce away from the post into a position over the dead plate. In order to eliminate this bounce behavior, a final transfer motion segment $30_7$ has been provided in which the pusher arm moves at a greatly reduced CREEP HOME VELOCITY as entered through the data screen 80. This value for a CREEP HOME VELOCITY is generally a function of the physical and inertial characteristics of the stepping motor and the pusher arm.

In the next subsection 83b of the PROFILE DATA section 83, the number of steps executed by the pusher arm during the transfer motion segments $30_1$-$30_8$ are explicitly defined. It will be recalled that the current step within each motion transfer segment is a variable in the stepping motor dwell period calculation of Equation I. As shown in the flowchart of FIG. 5, the conditional block 60 determines whether the last step of the particular motion segment has been executed, after which time the characteristics of the pusher motion for the next consecutive transfer motion segment are used. The values for the maximum number of steps of the pusher arm per each transfer motion segment are stored in the transfer motion segment tables within the profile generator memories. The first data entry concerns the total number of PUSHOUT STEPS, that is the actual number of steps the pusher arm moves through between initial forward motion of the arm and when the last bottle has been safely transferred to the conveyor belt. This total number of steps corresponds to the total number of pusher arm steps involved in the first three forward transfer motion segments $30_1$–$30_3$.

In the preferred embodiment, the number of steps is related to the motion of the pusher arm itself. The actual number of steps of the stepping motor is determined by the number of pusher steps defined in subsection 83$b$ multiplied by the gear ratio from the stepping motor to the transfer pusher arm. Thus, if the gear ratio is 3:1, and if the total number of forward motion pusher steps is 103, the stepping motor will move through 309 increments or steps during the forward motion 90° sweepout. The same relationship holds for the remaining step values input by the I.S. machine operator.

Immediately below the number of PUSHOUT STEPS on screen 80 are the number of INITIAL ACCELERATION STEPS and the number of PUSHOUT SLEW STEPS. The number of INITIAL ACCELERATION STEPS corresponds to the number of steps of the pusher arm (as well as the stepping motor as determined by the gear ratio) during the first motion transfer segment $30_1$. The number of PUSHOUT SLEW STEPS corresponds to the number of steps that the arm moves at the maximum velocity $V_{slew}$ during the transfer motion segment $30_2$. The number of steps that the pusher arm moves during the final forward motion deceleration segment $30_3$ is equal to the total number of pusher steps minus the number of initial acceleration steps minus the number of pusher slew steps. In the example shown in FIG. 9A, this value equals 103−40−50 equals 13 steps for the deceleration from the maximum velocity $V_{slew}$ to the minimum velocity $V_{min}$.

The remaining portion of the subsection 83$b$ corresponds to the reverse or return motion steps of the pusher arm as the arm returns from the 90° extended position to the home position. The total number of RETURN STEPS is the number of steps for the total return cycle. The ACCEL/DECEL RAMP STEPS corresponds to the transfer motion segments $30_4$ and $30_6$. Finally the number of CREEP HOME STEPS for the transfer motion segment $30_7$ can also be entered by the I.S. machine operator. The number of steps that the pusher arm moves through during the reverse maximum velocity $V_{slew}$ segment $30_5$ is determined by subtracting the number of creep home steps and twice the number of accel/decel ramp steps from the total number of return steps (which in the illustrated example is 104−2*25−1=53 steps).

The amount of time that the pusher arm remains at the home position or in the idle transfer motion segment $30_8$ is determined by the amount of time required for the pusher arm to execute all of the pusher steps and the return steps, and the amount of time that the pusher arm is idle after receipt of the marker pulse corresponding to the firing order), the sum of which is subtracted from the total I.S. machine cycle time. This amount of idle time is not directly input by the I.S. machine operator, nor is this information necessary to the operation of the article transfer mechanism of the present invention. Each pusher arm begins its 90° sweep on receipt of the marker pulse according to its firing order, rather than beginning its sweep after a predetermined idle time.

During the final motion segment $30_8$, the stepping motor is idle and is only resumes operation upon receipt of the marker pulse signal and the firing order signal from the profile generator.

The INITIAL ACCELERATION STEPS (in the illustrated embodiment equaling forty steps) sets the number of steps the pusher arm has to accelerate to match the conveyor speed $V_{slew}$. This value can be readily calculated by dividing the number of degrees that the pusher arm must move through before the lead bottle is on the moving conveyor by the number of degrees per step of the stepping motor, which in the preferred embodiment is 0.9°. Thus in the illustrated embodiment of FIG. 9A, the number of initial acceleration steps 40 corresponds to a value of 36° that the pusher arm moves from the dead plate until the lead bottle transferred by the pusher arm is fully on the conveyor belt. Similarly, the number of pusher slew steps (in the illustrated embodiment equaling fifty steps) can be calculated based on the number of degrees that the pusher arm moves through once the lead bottle is on the conveyor until the last bottle is on the conveyor divided by the total number of degrees per each stepping motor increment (0.9°). Thus in the illustrated embodiment of FIG. 8A, the total number of pusher slew steps of 50 corresponds to 45° of motion between the moment that the lead bottle is engaged on the conveyor belt until the moment that the last bottle is fully situated on the belt. Thus, the total number of angular degrees of motion of the pusher arm from the dead plate until the last bottle is fully on the conveyor belt equals the total number of initial acceleration steps and pusher slew steps times 0.9° per step or 81°. The remaining 9° correspond to the deceleration of the pusher arm from the $V_{slew}$.

The final subsection 83$c$ of the PROFILE DATA section corresponds to the entry of the exponents x and y for use in the dwell period calculation of Equation I. In the preferred embodiment, the initial acceleration motion segment $30_1$ is defined by a pair of INITIAL ACCELERATION exponents x and y, which in the illustrated embodiment equal 1.9. The remaining ramps or non-linear motion curve segments $30_3$, $3_4$ and $30_6$ are governed by the exponents for OTHER RAMPS in the right hand portion of subsection 83$c$. The remaining ramps are less critical since the bottle has already been transferred onto the moving conveyor and it is generally not essential as to what form the velocity profile curve takes for the pusher arm and stepping motor. However, the INITIAL ACCELERATION exponents in the left portion of the subsection 83$c$ are important because they define the particular shape of the velocity of the profile curve for the transfer motion segment $30_1$. The values for x and y for the first acceleration transfer motion segment $30_1$ can be varied according to the type of bottle being transferred.

In the illustrated embodiment of FIG. 9A, these exponents have been assigned a value of 1.9; however, other types of bottles may require different velocity profiles, as is known in the art. The shape of the velocity curve will vary according to the values of x and y for the acceleration transfer motion segment $30_1$. The object of deriving the exponents x and y is to achieve the fastest possible sweepout to the maximum velocity $V_{slew}$ without damaging the bottles and without taking an excessive amount of time for the complete sweepout. The exponents x and y for the initial acceleration are constrained to some degree by the difference between the maximum velocity $V_{slew}$ and the minimum velocity $V_{start}$ or $V_{min}$, along with the mechanical configuration of the stepping motor and pusher arm.

The physical characteristics of the machine setup are entered through the MACHINE SETUP screen 90 shown in FIG. 9B. Of primary importance from the screen is the initial setup lines of section 91 in which the PUSHOUT ARM RADIUS and the GEAR RATIO are entered. On the right portion of the MACHINE SETUP section 91, is a variable defined as the STEPS TO POWER-UP variable. This value determines the number of pusher arm steps that the stepping motor is driven at a low torque before it switches to a higher torque. That is, the stepping motor is driven at the lower torque value of the motor at the start of the transfer motion segments $30_1$–$30_8$ so that the motor does not engage the bottle with excessive torque or force. It has been found in practice that moving the stepping motor at too high an initial torque causes some bottles to deform or causes the pusher arm to contact the bottles too roughly. It has also been found that starting the stepping motor at a lower torque value reduces this risk of damage to the bottles.

However, once the stepping motor is in motion transferring the bottles toward the moving conveyor, a higher torque is required to maintain the inertial forces moving the bottle through the 90° sweep. Also, the return stroke of the pusher arm can be at a higher torque to minimize the return time and maximize the life of the motor. Thus, a value can be entered by the I.S. machine operator to determine the total number of steps that the stepping motor will execute at the lower torque value of the motor before the higher torque windings of the stepping motor are energized. This value can be altered depending upon the type of bottle being transferred and the particular transfer motion segment characteristics desired for a particular I.S. machine setup.

Alternatively, an optional data word stored in the transfer motion segment tables or in a separate look-up table in PROM can provide motor torque profiling information. This torque profile data can provide for variations in the stepping motor torque during an entire sweep of the pusher arm, rather than just at the beginning of motion. The torque profile information may also be derived from an equation similar to the velocity profile Equation IV described above.

A second entry by the I.S. machine operator of section 91 of screen 90 is a SPEED CALIBRATION value. This SPEED CALIBRATION value is used to "fine tune" the pusher arm and stepping motor speed to better match the conveyor speed. In other words, the SPEED CALIBRATION value is a multiplier for the maximum $V_{slew}$. This multiplier permits fine adjustment to the maximum velocity $V_{slew}$ if it is discovered that the calculated velocity $V_{slew}$ does not correspond closely enough to the actual conveyor belt speed. Due to mechanical inefficiencies and variations in mechanical dimensions, it is possible that the calculated value for the conveyor speed, as manifested by $V_{slew}$, can be off by a small amount. This speed calibration value permits correction of any error between the actual conveyor speed and the calculated conveyor speed.

In an alternative embodiment, the maximum velocity $V_{slew}$ is a user entered value. In this instance, the user entered $V_{slew}$ can supplant the need for the SPEED CALIBRATION entry in section 91 of screen 90. Thus, the I.S. machine operator can automatically change the absolute value for the conveyor speed rather than changing a particular multiplier to that speed that is used in the A and B coefficient calculations of Equations II–III. In a further variation on this same concept, rather than having the I.S. machine operator enter an entirely new value for the conveyor speed $V_{slew}$, separate increment and decrement keys may be provided on the keyboard console 24. These increment and decrement keys can be provided to increase or decrease the value of the initially entered $V_{slew}$ by some predetermined amount. For instance, when the increment key is pushed once, the value of $V_{slew}$ is increased by a fixed amount, while pushing the increment key twice increases the $V_{slew}$ by twice this predetermined amount.

A feature of this type on the keyboard of console 24 would not require that the I.S. machine operator know what the actual conveyor speed is and would not require him to enter an actual known value for the conveyor speed. Once the conveyor speed value has been changed, observation of the I.S. machine and 90° pusher operation can be observed to determine whether the correct conveyor speed $V_{slew}$ by each of the profile generators $25_1$–$25_K$. Direct entry of the $V_{slew}$ eliminates the need for the conveyor speed calculation of Equation IV so the user entries for PUSHOUT ARM RADIUS and GEAR RATIO of screen 90 and NUMBER OF SECTIONS, NUMBER OF GOBS and WARE SPACING from screen 80 are not longer required. However, some of these entries may be used as part of a bottle count function of the article transfer mechanism of the present invention as described below.

Section 92 of the screen 90 of FIG. 9B illustrates yet another feature of the present invention. In one embodiment of the invention, a bottle counting feature is provided and the total number of bottles transferred out of the conveyor per each section can be displayed on the screen 90. Since the number of gobs per section and number of sections per I.S. machine setup is known via the user inputs discussed above, it can also be readily determined how many bottles have been transferred from their dead plates to the moving conveyor belt by simply counting the number of complete sweepout motions made by each transfer mechanism $14_1$–$14_K$. Thus, each time each transfer mechanism is moved through the transfer motion segments $30_1$–$30_8$, a bottle counter can be incremented by the appropriate number of bottles transferred at that time. Capability also can exist for determining how many rejected bottles arose from each transfer.

Screen 95 of FIG. 9C provides means for programming each of the individual sections of the total I.S. machine setup. For example, the SECTION OFFSET value 96 corresponds to the number of degrees after the master section offset signal has been determined by the main shaft period sensor 27 before the section transfer mechanism $14_k$ begins its pusher sequence. Each section of the total I.S. machine setup will have its own section offset which corresponds to the firing order and firing time for that particular section. Examples of firing time and firing order have been discussed previously, it being sufficient at this juncture to simply indicate that the SECTION OFFSET in angular degrees may be input by the I.S. machine operator.

In the I.S. system of the preferred embodiment, as more explicity described in U.S. Pat. No. 4,923,499 to Newkirk, the pusher arm is extended and retracted pneumatically. Thus, each section includes an POCKET AIR OFFSET value 97 and a RETRACT OFFSET value 98 which determines when the air extension pneumatics is activated to extend and to retract the pusher arm. For the inputs illustrated in FIG. 8C, these POCKET AIR and RETRACT OFFSETs are input as degrees from a marker pulse as sensed by the shaft rotation sensor 20. However, these values may also be input as the number of steps from the initial start of motion of the pusher arm 14. In particular, the RETRACT OFFSET value may be the total number of steps of the pusher arm before the arm is physically retracted by the retract pneumatics. It is typical in the art to begin to retract the arm just before the end of the slew transfer motion segment $30_2$. It is at this point that all of the bottles being transferred by the pusher arm are on the conveyor and generally moving at the conveyor speed. Thus, the pusher arms and particularly the fingers 18 of the arms are no longer required to maintain the position and orientation of the bottles, so that the pusher arm may be retracted.

Also included on screen 95 is an output 98 which indicates whether the particular section is in the middle of its 90° sweepout cycle. An asterisk in the brackets of output 98 indicates that the section is cycling, while a blank between those brackets indicates that the section is idle. A further indication of the activity of all the sections of a particular I.S. machine setup is shown in screen 100 in FIG. 9D. In that screen, each of the sections includes a cycle indicator which retains the asterisk nomenclature to show operation of the particular section. This SECTION STATUS screen 100 also indicates whether an error in detecting the marker pulse has been indicated for a section, such as section 5 in the particular example. In addition, this screen indicates whether data communication from each profile generator $25_1$–$25_K$ to the master controller 22 has been interrupted for some reason, such as the "NO RESPONSE FROM SECTION" message for section 8 or the "CHECK SECTION DISABLE SWITCH" message for section 4. The display on screen 100 is continuously updated with the receipt of each marker pulse to the master controller 22. The master controller 22 surveys each of the profile generator section cards $25_1$–$25_K$ to determine its operational mode and whether that section is functioning correctly. Thus, the I.S. machine operator has an immediate and constantly updated indication of performance of each of the I.S. pusher sections.

The master controller 22 continuously polls each of the profile generators 25 along data bus 23. The controller polls each section to determine that the sections are receiving the marker pulse and are cycling through the pusher arm sweep properly. Each profile generator 25 includes circuitry for generating an error message corresponding to a malfunction of the generator or pusher arm for the particular section. Malfunction of the pusher arm may occur, for instance, when the arm does not fully extend or fails to return to the home position adjacent the dead plate. Sensors may be provided at the half-cycle (90°) and home positions to provide means for producing an error signal as required.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, it is understood that although the article transfer mechanism of the preferred embodiment is disclosed as a 90° pusher, similar mechanisms for transferring articles over larger ranges of rotation or motion are contemplated by the present invention.

What is claimed is:

1. An article transfer mechanism for transferring a number of glassware articles from a dead plate of a glassware forming machine to a take-away conveyor, comprising:
    a pusher arm having means for engaging the number of glassware articles, said pusher arm being movable between a first position to engage the glassware at the dead plate and a second position at which the glassware is transferred to the take-away conveyor;
    means for moving said pusher arm between said first and said second positions, including;
        current position means for maintaining an indicator value indicative of a current position of said pusher arm as said arm moves between said first and second positions;
        software means for performing realtime calculations at said current position of said pusher arm according to a velocity equation contained in a memory to determine a new velocity for said pusher arm as a function of said indicator value, said equation being a function of a number of variables and said software means including means for manually changing said variables in realtime to change said equation in memory; and
    a motor, responsive to said software means, for moving said pusher arm from said current position of said pusher arm at said new velocity,
    wherein each new velocity calculated at each current position defines a velocity profile between said first and second positions.

2. The article transfer mechanism of claim 1, wherein:
    said motor is a motor capable of step-wise motion;
    said indicator value corresponds to the current number of steps of motor step-wise motion from said first position to said current position; and
    said current position means includes means for incrementing said indicator value after each motor step.

3. The article transfer mechanism of claim 1 in which the glassware forming machine operates through a cycle to produce glassware to be transferred to the take-away conveyor and wherein:
    said meanss for moving includes means for determining the glassware forming machine cycle time;
    said equation is a function of a second number of variables which are a function of the glassware forming machine cycle time; and
    said software means includes means for calculating said second number of variables at the beginning of each new glassware forming machine cycle.

4. The article transfer mechanism of claim 1, wherein:
    said software means includes a plurality of velocity equations corresponding to a plurality of transfer motion segments of said velocity profile between said first and second positions, each of said plurality of velocity equations being dependent upon said indicator value and each being a function of said number of variables to permit changes in said transfer motion segments.

5. An article transfer mechanism for transferring a number of glassware articles from a dead plate of a glassware forming machine to a take-away conveyor, comprising:

a pusher arm having means for engaging the number of glassware articles, said pusher arm being movable between a first position to engage the glassware at the dead plate and a second position at which the glassware is transferred to the take-away conveyor;

a motor coupled to said pusher arm for controlling the motion of said arm between said first position and said second position;

means for generating a periodic timing signal; and motor control means for controlling the speed of said motor based upon a realtime calculation, according to a velocity equation contained in a memory, of a new speed of said motor, said calculation occurring at each of several discrete times determined by said timing signal while said pusher arm moves between said first and second positions, said equation being a function of a number of variables and said motor control means including means for manually changing said number of variables in realtime to vary said equation in memory, wherein each new speed calculated at each current position defines a velocity profile between said first and second positions.

6. The article transfer mechanism of claim 5, wherein said means for generating a periodic timing signal includes an oscillator providing said timing signals independent of the glassware forming machine cycle.

7. The article transfer mechanism of claim 6, wherein said oscillator is a variable oscillator to vary the rate of generation of said timing signals independent of the glassware forming machine cycle, whereby changes in the rate of generation of said timing signals result in corresponding changes in said new speed of said motor at each of said several discrete times.

8. An article transfer mechanism for transferring a number of glassware articles from a dead plate of a glassware forming machine to a moving take-away conveyor, comprising:

a pusher arm having means for engaging the number of glassware articles, said pusher arm being movable between a first position to engage the glassware at the dead plate and a second position at which the glassware is transferred to the take-away conveyor;

a motor coupled to said pusher arm for controlling the motion of said arm between said first position and said second position; and means for controlling the speed of said motor so that said pusher arm moves between said first and second positions according to a velocity profile, said velocity profile having a pre-determined minimum velocity and a maximum velocity related to the speed of the moving take-away conveyor, said speed controlling means including non-scalar means for changing said maximum speed in realtime while said article transfer mechanism is operating to transfer glassware articles in relation to changes in the speed of the take-away conveyor while said minimum velocity remains unchanged.

9. The article transfer mechanism of claim 8, wherein said means for controlling the speed of said motor includes:

means for determining the speed of the moving take-away conveyor;

means for calculating a new velocity of said pusher arm between said minimum velocity and said maximum velocity according to an equation stored in electronic memory, said equation being a function of the conveyor speed and a position value corresponding to a current position of said pusher arm between said first and second positions, whereby said new velocity of said pusher arm when calculated with said pusher arm at said second position is approximately equal to the speed of the conveyor.

10. An article transfer mechanism for transferring a number of glassware articles from a dead plate of a glassware forming machine to a moving take-away conveyor, comprising:

a pusher arm having means for engaging the number of glassware articles, said pusher arm being movable between a first position to engage the glassware at the dead plate and a second position at which the glassware is transferred to the take-away conveyor;

a motor coupled to said pusher arm for controlling the motion of said arm between said first position and said second position;

means, including a microcontroller, for controlling the speed of said motor so that said pusher arm moves between said first and second positions according to a velocity profile;

means for performing realtime calculations defined in a software algorithm stored in memory in said microcontroller, while said pusher arm is moving, to generate said velocity profile, said algorithm being a function of a number of variable data words stored in memory in the microcontroller; and a data entry terminal having an output coupled to said microcontroller, whereby said data entry terminal includes means for manually changing said variable data words in said memory and for realtime use in said calculations while the article transfer mechanism is operating.

11. The article transfer mechanism of claim 1, wherein:

said equation is an exponential equation and at least one of said number of variables is an exponent.

12. The article transfer mechanism of claim 5, wherein:

said equation is an exponential equation and at least one of said number of variables is an exponent.

13. An article transfer mechanism for continuously transferring a number articles from a first location to a moving conveyor, comprising:

a pusher arm having means for engaging the number of articles, said pusher arm being movable between a first position to engage the article as the first location and a second position at which the article is transferred to the conveyor;

a motor having means for moving said pusher arm between said first and second positions in response to a controller; and software means for controlling velocities of said motor to move said pusher arm according to a velocity profile, said software means including non-scalar means for changing said velocity profile in realtime as said article transfer mechanism is operating to continuously transfer articles.

14. An article transfer mechanism for continuously transferring a number articles from a first location to a moving conveyor, comprising:

a pusher arm having means for engaging the number of articles, said pusher arm being movable between a first position to engage the article as the first location and a second position at which the article is transferred to the conveyor;

a motor having means for moving said pusher arm between said first and second positions in response to a controller; and software means for controlling velocities of said motor to move said pusher arm according to a velocity profile, said software means including non-scalar means for changing said velocity profile in realtime in response to a number of manually changeable variables as said article transfer mechanism is operating to continuously transfer articles.

* * * * *